(12) United States Patent
Atreya

(10) Patent No.: US 12,692,000 B2
(45) Date of Patent: Jul. 28, 2026

(54) BLENDED WING BODY AIRCRAFT WITH A FUEL CELL AND METHOD OF USE

(71) Applicant: JETZERO, INC., Long Beach, CA (US)

(72) Inventor: Shailesh Atreya, Orange, CA (US)

(73) Assignee: JetZero, Inc., Long Beach, CA (US)

( * ) Notice: Subject to any disclaimer, the term of this patent is extended or adjusted under 35 U.S.C. 154(b) by 0 days.

(21) Appl. No.: 18/538,226

(22) Filed: Dec. 13, 2023

(65) Prior Publication Data

US 2024/0239485 A1　　Jul. 18, 2024

Related U.S. Application Data

(63) Continuation-in-part of application No. 17/478,724, filed on Sep. 17, 2021, now Pat. No. 11,878,798.

(51) Int. Cl.
| | |
|---|---|
| *B64C 39/10* | (2006.01) |
| *B64D 27/10* | (2006.01) |
| *B64D 27/33* | (2024.01) |
| *B64D 27/355* | (2024.01) |
| *B64D 41/00* | (2006.01) |
| *H01M 8/04082* | (2016.01) |

(52) U.S. Cl.
CPC .............. *B64C 39/10* (2013.01); *B64D 27/10* (2013.01); *B64D 27/33* (2024.01); *B64D 27/355* (2024.01); *B64D 41/00* (2013.01); *H01M 8/04201* (2013.01); *B64C 2039/105* (2013.01); *B64D 2041/005* (2013.01); *H01M 2250/20* (2013.01)

(58) Field of Classification Search
CPC ... B64C 39/10; B64C 2039/105; B64D 27/10;

B64D 27/33; B64D 27/355; B64D 41/00; B64D 2041/005; B64D 27/24; H01M 8/04201; H01M 2250/20; Y02T 90/40
See application file for complete search history.

(56) References Cited

U.S. PATENT DOCUMENTS

| | | | | | |
|---|---|---|---|---|---|
| 2,562,491 | A | * | 7/1951 | Hall | B64C 37/00 |
| | | | | | 244/50 |
| 3,065,927 | A | * | 11/1962 | Walter | B64C 37/00 |
| | | | | | 244/2 |
| 3,138,351 | A | * | 6/1964 | Zuck | B64C 3/56 |
| | | | | | 244/49 |

(Continued)

FOREIGN PATENT DOCUMENTS

| | | |
|---|---|---|
| EP | 3805107 A1 | 4/2021 |
| FR | 3100798 A1 | 3/2021 |

(Continued)

OTHER PUBLICATIONS

PCT/US2024/033773; International Search Report—Date: Oct. 23, 2024—By: Taina Matos.

(Continued)

*Primary Examiner* — Medhat Badawi
(74) *Attorney, Agent, or Firm* — Jeffrey Schox

(57) ABSTRACT

Certain aspects relate to a blended wing body aircraft with a fuel cell and methods of use. An exemplary aircraft includes a blended wing body, at least a propulsor mechanically affixed to the aircraft and configured to propel the aircraft, at least a first fuel store configured to store a first fuel, and at least a fuel cell configured to combine the first fuel with oxygen to produce electricity.

20 Claims, 7 Drawing Sheets

(56) References Cited

U.S. PATENT DOCUMENTS

| | | | | |
|---|---|---|---|---|
| 4,627,585 | A * | 12/1986 | Einstein | B60F 5/02 |
| | | | | 244/49 |
| 5,106,035 | A * | 4/1992 | Langford, III | B64D 27/24 |
| | | | | 244/62 |
| 5,893,535 | A * | 4/1999 | Hawley | B64C 3/00 |
| | | | | 244/119 |
| 5,909,858 | A * | 6/1999 | Hawley | B64C 3/00 |
| | | | | 244/45 R |
| 6,347,719 | B1 * | 2/2002 | Rosen | B64D 37/30 |
| | | | | 220/586 |
| 6,568,632 | B2 * | 5/2003 | Page | B64U 10/20 |
| | | | | 244/36 |
| 6,568,633 | B2 * | 5/2003 | Dunn | B64D 35/022 |
| | | | | 244/59 |
| 6,572,053 | B2 * | 6/2003 | Salas | B60V 1/02 |
| | | | | 244/73 C |
| 6,666,406 | B2 * | 12/2003 | Sankrithi | B64C 39/04 |
| | | | | 244/119 |
| 6,877,690 | B1 * | 4/2005 | Bragg | B64C 37/00 |
| | | | | 244/219 |
| 6,923,403 | B1 * | 8/2005 | Dizdarevic | B64C 1/0009 |
| | | | | 244/36 |
| 7,093,798 | B2 * | 8/2006 | Whelan | B64C 1/065 |
| | | | | 244/120 |
| 7,871,042 | B2 * | 1/2011 | Velicki | B64D 37/06 |
| | | | | 244/135 R |
| 8,353,478 | B1 * | 1/2013 | Kismarton | B64C 9/38 |
| | | | | 244/119 |
| 9,108,738 | B1 * | 8/2015 | Tweet | B64D 37/14 |
| 9,422,139 | B1 * | 8/2016 | Bialkowski | B66C 13/06 |
| 9,493,246 | B2 * | 11/2016 | Barmichev | B64D 37/04 |
| 9,676,481 | B1 * | 6/2017 | Buchmueller | G05D 1/0094 |
| 10,023,312 | B2 * | 7/2018 | Repp | H04N 23/63 |
| 10,071,804 | B1 * | 9/2018 | Buchmueller | B64U 50/19 |
| 10,227,129 | B2 * | 3/2019 | Fisher | B64C 5/06 |
| 10,414,484 | B2 * | 9/2019 | Moxon | B64C 3/52 |
| 10,519,013 | B2 * | 12/2019 | Curran | B66D 1/741 |
| D875,183 | S * | 2/2020 | Alonso | D21/445 |
| 10,773,817 | B1 * | 9/2020 | Brennen | B64D 33/02 |
| 10,807,013 | B2 * | 10/2020 | Alonso | B64C 31/06 |
| 10,946,962 | B2 * | 3/2021 | Banerjee | B64C 3/14 |
| 11,179,989 | B2 * | 11/2021 | Che | B60F 5/02 |
| 11,209,836 | B1 * | 12/2021 | Sikora | G05D 1/101 |
| 11,247,776 | B2 * | 2/2022 | Princen | B64D 27/14 |
| 11,613,356 | B2 * | 3/2023 | Banerjee | B64C 1/0009 |
| | | | | 244/36 |
| 11,697,500 | B2 * | 7/2023 | Whitlock | B64C 39/10 |
| | | | | 244/119 |
| 11,878,798 | B2 | 1/2024 | Atreya et al. | |
| 2004/0069897 | A1 * | 4/2004 | Corcoran | B64D 27/355 |
| | | | | 244/10 |
| 2004/0245382 | A1 * | 12/2004 | Nozaki | B64D 27/24 |
| | | | | 244/53 R |
| 2006/0219847 | A1 * | 10/2006 | Miller | B64C 23/00 |
| | | | | 244/130 |
| 2007/0237991 | A1 * | 10/2007 | Eichhorn | C22C 5/02 |
| | | | | 429/492 |
| 2008/0006743 | A1 * | 1/2008 | Miller | B64U 10/25 |
| | | | | 244/53 R |
| 2008/0230654 | A1 * | 9/2008 | Velicki | B64D 37/04 |
| | | | | 244/135 R |
| 2009/0212162 | A1 * | 8/2009 | Ward | B64D 37/04 |
| | | | | 244/135 R |
| 2010/0181414 | A1 * | 7/2010 | Lopez, Jr. | B64C 29/0033 |
| | | | | 244/12.4 |
| 2010/0187237 | A1 * | 7/2010 | Brooks | F17C 1/12 |
| | | | | 220/660 |
| 2012/0119020 | A1 | 5/2012 | Burns et al. | |
| 2014/0174083 | A1 * | 6/2014 | Gerstler | F17C 9/04 |
| | | | | 60/671 |
| 2014/0175215 | A1 * | 6/2014 | Gallant | B64F 1/30 |
| | | | | 244/36 |

| | | | | |
|---|---|---|---|---|
| 2015/0007585 | A1 * | 1/2015 | Kawai | B64D 37/30 |
| | | | | 62/48.2 |
| 2015/0032176 | A1 * | 1/2015 | Mintchev | A61N 1/36007 |
| | | | | 607/40 |
| 2015/0307201 | A1 * | 10/2015 | Criado | B64D 41/00 |
| | | | | 244/58 |
| 2015/0321767 | A1 | 11/2015 | Kamath et al. | |
| 2016/0111885 | A1 * | 4/2016 | Roques | H01H 33/02 |
| | | | | 29/428 |
| 2016/0236790 | A1 * | 8/2016 | Knapp | G08G 5/0052 |
| 2017/0021760 | A1 * | 1/2017 | Calnek | B60Q 1/482 |
| 2017/0029131 | A1 * | 2/2017 | Steinwandel | B64U 30/10 |
| 2017/0081035 | A1 * | 3/2017 | Becker | B64D 29/00 |
| 2017/0217603 | A1 | 8/2017 | Cabral et al. | |
| 2018/0001999 | A1 * | 1/2018 | Page | B64C 25/14 |
| 2018/0037327 | A1 * | 2/2018 | Hoffjann | B64D 41/00 |
| 2018/0114995 | A1 * | 4/2018 | Stoia | H01M 8/04225 |
| 2018/0178920 | A1 * | 6/2018 | Swann | B64D 27/24 |
| 2018/0291807 | A1 * | 10/2018 | Dalal | B64D 27/18 |
| 2018/0334254 | A1 * | 11/2018 | Saint-Marc | B64D 11/003 |
| 2019/0135424 | A1 * | 5/2019 | Baity | B64C 29/0033 |
| 2019/0300170 | A1 * | 10/2019 | Bousfield | B64C 37/00 |
| 2019/0322379 | A1 * | 10/2019 | Mackin | F02C 9/20 |
| 2019/0322382 | A1 * | 10/2019 | Mackin | B64D 31/18 |
| 2019/0323426 | A1 * | 10/2019 | Mackin | F02C 3/32 |
| 2019/0323427 | A1 * | 10/2019 | Mackin | B64D 27/10 |
| 2019/0344898 | A1 * | 11/2019 | Scothern | B64D 35/023 |
| 2019/0382123 | A1 * | 12/2019 | Schwarz | F02C 6/14 |
| 2020/0207471 | A1 * | 7/2020 | Yasuda | B64D 1/22 |
| 2020/0254900 | A1 * | 8/2020 | Kumar | H02P 5/74 |
| 2020/0290742 | A1 * | 9/2020 | Kumar | B64D 27/35 |
| 2020/0307789 | A1 * | 10/2020 | Princen | B64D 33/06 |
| 2020/0407060 | A1 * | 12/2020 | Hosseini | B64D 27/24 |
| 2021/0222629 | A1 * | 7/2021 | Terwilliger | B64D 27/33 |
| 2021/0254507 | A1 * | 8/2021 | Tejero | F01D 25/24 |
| 2022/0001974 | A1 * | 1/2022 | Page | B64C 25/04 |
| 2022/0042465 | A1 * | 2/2022 | Swann | F02C 6/20 |
| 2022/0052361 | A1 * | 2/2022 | Morrison | H01M 8/04014 |
| 2022/0055762 | A1 * | 2/2022 | Clarke | H01M 8/04701 |
| 2022/0063819 | A1 * | 3/2022 | Murrow | B64D 27/31 |
| 2022/0131165 | A1 * | 4/2022 | Ballantine | B64F 1/36 |
| 2022/0275733 | A1 * | 9/2022 | Hollingshead | B64D 33/02 |
| 2022/0388633 | A1 * | 12/2022 | Page | B64C 25/04 |
| 2023/0091919 | A1 * | 3/2023 | Stump | G06F 3/04847 |
| | | | | 715/735 |
| 2023/0091929 | A1 * | 3/2023 | Atreya | B64D 27/24 |
| | | | | 244/135 R |
| 2023/0092281 | A1 * | 3/2023 | Rawdon | B64C 17/10 |
| | | | | 244/135 C |
| 2023/0143459 | A1 * | 5/2023 | Clark | B64D 27/402 |
| | | | | 244/7 R |
| 2023/0348090 | A1 * | 11/2023 | O'Leary | B64D 37/30 |
| 2024/0239485 | A1 * | 7/2024 | Atreya | B64C 39/10 |

FOREIGN PATENT DOCUMENTS

| | | |
|---|---|---|
| JP | 2007-129872 A | 5/2007 |
| WO | 2025159730 A2 | 7/2025 |

OTHER PUBLICATIONS

Guynn, Evaluation of a Hydrogen Fuel Cell Powered Blended-Wing-Body Aircraft Concept for Reduced Noise and Emissions, Feb. 1, 2004.

Airbus, These new Airbus concept aircraft have one thing in common, Sep. 21, 2020.

Kleemann, Conceptual Design and Optimization of a Solar-Electric Blended Wing Body Aircraft for General Aviation, Jan. 31, 2020.

International Search Report; PCT/US2024/033773; Date: Oct. 1, 2024; By: Taina Matos.

Van Woesnel, C.W.C., "Integration of a Liquid Hydrogen Fuel Tank into the Concept of the Flying-V", TU Delft Library, https://resolver.tudelft.nl/uuid:e45d2acb-2c85-4543-9160-536fb5195bc6, Master Thesis (2021).

* cited by examiner

505

Storing a first fuel

510

Combining first fuel with oxygen to produce electricity

515

Storing a second fuel

520

Propel aircraft

500

605 Storing a first fuel

610 Combining a first fuel with oxygen to produce electricity

615 Storing a second fuel

620 Controlling an Aircraft

625 Consuming a First Fuel During a First Flight Mode

630 Consuming a Second Fuel During a Second Flight Mode

600

BLENDED WING BODY AIRCRAFT WITH A FUEL CELL AND METHOD OF USE

CROSS-REFERENCE TO RELATED APPLICATIONS

This application is a continuation-in-part of Non-provisional application Ser. No. 17/478,724 filed on Sep. 17, 2021, and entitled "BLENDED WING BODY AIRCRAFT WITH A FUEL CELL AND METHOD OF USE," the entirety of which is incorporated herein by reference.

FIELD OF THE INVENTION

The present invention generally relates to the field of aircraft. In particular, the present invention is directed to a blended wing body aircraft with a fuel cell and method of use.

BACKGROUND

Human flight is a large contributor of greenhouse gases, the effects of which are compounded by their release high in the atmosphere. However, non-greenhouse gas generating energy storage methods are less energy dense, according to one or both of volumetric energy density and weight energy density. Presently, current aircraft designs are tightly constrained in both storage volume and weight.

SUMMARY OF THE DISCLOSURE

In an aspect, an aircraft with a fuel cell is disclosed. The aircraft includes at least a first fuel store located within the aircraft and configured to store a first fuel, wherein the first fuel of the at least a first fuel store is configured to be consumed during a first flight mode of the aircraft, at least a fuel cell configured to combine the first fuel with oxygen to produce electricity, at least a second fuel store located within the aircraft and configured to store a second fuel, wherein the second fuel of the at least a second fuel store is configured to be consumed during a second flight mode of the aircraft and at least a flight component mechanically affixed to the aircraft and configured to propel the aircraft.

In another aspect, a method of use of an aircraft with a fuel cell is disclosed. The method includes storing, using at least a first fuel store located within the aircraft, a first fuel, combining, using at least a fuel cell, the first fuel with oxygen to produce electricity, storing, using at least a second fuel store located within the aircraft, a second fuel, propelling, using at least a flight component mechanically affixed to the aircraft, the aircraft, consuming the first fuel of the at least a first fuel store during the first flight mode of the aircraft and consuming the second fuel of the at least a first second store during the second flight mode of the aircraft.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for using a fuel cell within a blended wing body aircraft (i.e., blended wing aircraft). In an embodiment, a blended wing aircraft allows for an increase in volumetric storage space allowing of use of liquid hydrogen fuel, which has less energy per unit volume than conventional aircraft fuel.

Aspects of the present disclosure can be used to power aircraft propulsors using a fuel cell. Aspects of the present disclosure can also be used to power an auxiliary power system using a fuel cell.

Aspects of the present disclosure allow for use of non-greenhouse gas emitting fuels to power human flight. Exemplary embodiments illustrating aspects of the present disclosure are described below in the context of several specific examples.

In the following description, for the purposes of explanation, numerous specific details are set forth in order to provide a thorough understanding of the present invention. For purposes of description herein, relating terms, including "upper," "lower," "left," "rear," "right," "front," "vertical," "horizontal," and derivatives thereof relate to embodiments oriented as shown for exemplary purposes in FIG. 1. Furthermore, there is no intention to be bound by any expressed or implied theory presented in this disclosure.

Figure 1:
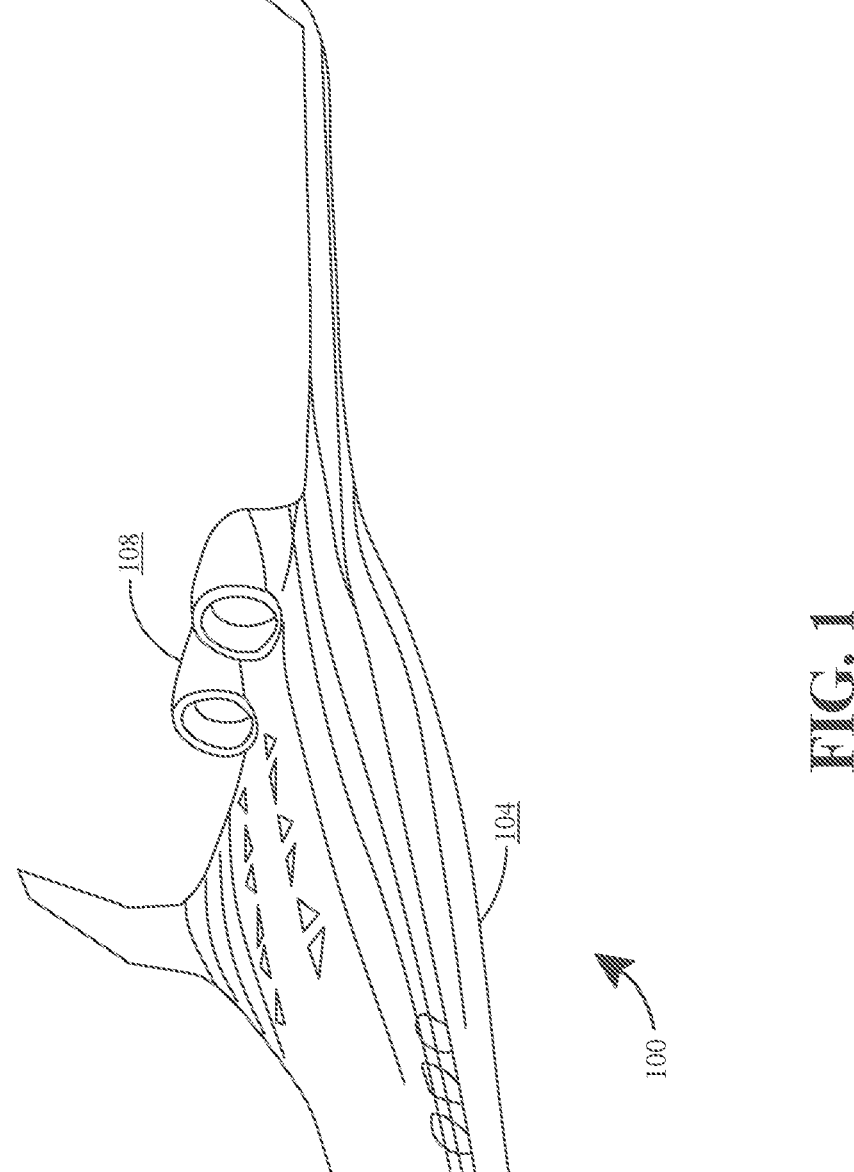
FIG. 1 illustrates an exemplary blended wing body aircraft with a fuel cell.

Referring to FIG. 1, an exemplary aircraft 100 is illustrated. Aircraft 100 may include a blended wing body 104. For the purposes of this disclosure, a "blended wing body aircraft" is an aircraft having a blended wing body. As used in this disclosure, A "blended wing body" (BWB), also known as a "blended body" or a "hybrid wing body" (HWB), is a fixed-wing aircraft body having no clear demarcation between wings and a main body of the aircraft at a leading edge of the wings. For example, a BWB 104 aircraft may have distinct wing and body structures, which are smoothly blended together with no clear dividing line or boundary feature between wing and fuselage. This contrasts with a flying wing, which has no distinct fuselage, and a lifting body, which has no distinct wings. A BWB 104 design may or may not be tailless. One potential advantage of a BWB 104 may be to reduce wetted area and any accompanying drag associated with a conventional wing-body junction. In some cases, a BWB 104 may also have a wide airfoil-shaped body, allowing entire aircraft to generate lift and thereby facilitate reduction in size and/or drag of wings. In some cases, a BWB 104 may be understood as a hybrid shape that resembles a flying wing, but also incorporates features from conventional aircraft. In some cases, this combination may offer several advantages over conventional tube-and-wing airframes. In some cases, a BWB airframe 104 may help to increase fuel economy and create larger payload (cargo or passenger) volumes within the BWB. BWB 104 may allow for advantageous interior designs. For instance, cargo can be loaded and/or passengers can board from the front or rear of the aircraft. A cargo or passenger area may be distributed across a relatively wide (when compared to conventional tube-wing aircraft) fuselage, providing a large usable volume. In some embodiments, passengers seated within an interior of aircraft, real-time video at every seat can take place of window seats.

With continued reference to FIG. 1, BWB 104 of aircraft 100 may include a nose portion. A "nose portion," for the purposes of this disclosure, refers to any portion of aircraft 100 forward of the aircraft's fuselage 116. Nose portion may comprise a cockpit (for manned aircraft), canopy, aerodynamic fairings, windshield, and/or any structural elements required to support mechanical loads. Nose portion may also include pilot seats, control interfaces, gages, displays, inceptor sticks, throttle controls, collective pitch controls, and/or communication equipment, to name a few. Nose portion may comprise a swing nose configuration. A swing nose may be characterized by an ability of the nose to move, manually or automatedly, into a differing orientation than its flight orientation to provide an opening for loading a payload into aircraft fuselage from the front of the aircraft. Nose portion may be configured to open in a plurality of orientations and directions.

With continued reference to FIG. 1, BWB 104 may include at least a structural component of aircraft 100. Structural components may provide physical stability during an entirety of an aircraft's 100 flight envelope, while on ground, and during normal operation Structural components may comprise struts, beams, formers, stringers, longerons, interstitials, ribs, structural skin, doublers, straps, spars, or panels, to name a few. Structural components may also comprise pillars. In some cases, for the purpose of aircraft cockpits comprising windows/windshields, pillars may include vertical or near vertical supports around a window configured to provide extra stability around weak points in a vehicle's structure, such as an opening where a window is installed. Where multiple pillars are disposed in an aircraft's 100 structure, they may be so named A, B, C, and so on named from nose to tail. Pillars, like any structural element, may be disposed a distance away from each other, along an exterior of aircraft 100 and BWB 104. Depending on manufacturing method of BWB 104, pillars may be integral to frame and skin, comprised entirely of internal framing, or alternatively, may be only integral to structural skin elements. Structural skin will be discussed in greater detail below.

With continued reference to FIG. 1, BWB 104 may include a plurality of materials, alone or in combination, in its construction. At least a BWB 104, in an illustrative embodiment may include a welded steel tube frame further configured to form a general shape of a nose corresponding to an arrangement of steel tubes. Steel may include any of a plurality of alloyed metals, including but not limited to, a varying amount of manganese, nickel, copper, molybdenum, silicon, and/or aluminum, to name a few. Welded steel tubes may be covered in any of a plurality of materials suitable for aircraft skin. Some of these may include carbon fiber, fiberglass panels, cloth-like materials, aluminum sheeting, or the like. BWB 104 may comprise aluminum tubing mechanically coupled in various and orientations. Mechanical fastening of aluminum members (whether pure aluminum or alloys) may comprise temporary or permanent mechanical fasteners appreciable by one of ordinary skill in the art including, but not limited to, screws, nuts and bolts, anchors, clips, welding, brazing, crimping, nails, blind rivets, pull-through rivets, pins, dowels, snap-fits, clamps, and the like. BWB 104 may additionally or alternatively use wood or another suitably strong yet light material for an internal structure.

With continued reference to FIG. 1, aircraft 100 may include monocoque or semi-monocoque construction. BWB 104 may include carbon fiber. Carbon fiber may include carbon fiber reinforced polymer, carbon fiber reinforced plastic, or carbon fiber reinforced thermoplastic (e.g., CFRP, CRP, CFRTP, carbon composite, or just carbon, depending on industry). "Carbon fiber," as used in this disclosure, is a composite material including a polymer reinforced with carbon. In general, carbon fiber composites consist of two parts, a matrix and a reinforcement. In carbon fiber reinforced plastic, the carbon fiber constitutes the reinforcement, which provides strength. The matrix can include a polymer resin, such as epoxy, to bind reinforcements together. Such reinforcement achieves an increase in CFRP's strength and rigidity, measured by stress and elastic modulus, respectively. In embodiments, carbon fibers themselves can each comprise a diameter between 5-10 micrometers and include a high percentage (i.e. above 85%) of carbon atoms. A person of ordinary skill in the art will appreciate that the advantages of carbon fibers include high stiffness, high tensile strength, low weight, high chemical resistance, high temperature tolerance, and low thermal expansion. According to embodiments, carbon fibers may be combined with other materials to form a composite, when permeated with plastic resin and baked, carbon fiber reinforced polymer becomes extremely rigid. Rigidity may be considered analogous to stiffness which may be measured using Young's Modulus. Rigidity may be defined as a force necessary to bend and/or flex a material and/or structure to a given degree. For example, ceramics have high rigidity, which can be visualized by shattering before bending. In embodiments, carbon fibers may additionally, or alternatively, be composited with other materials like graphite to form reinforced carbon-carbon composites, which include high heat tolerances over 2000° C. A person of skill in the art will further appreciate that aerospace applications may require high-strength, low-weight, high heat resistance materials in a plurality of roles, such as without limitation fuselages, fairings, control surfaces, and structures, among others.

With continued reference to FIG. 1, BWB 104 may include at least a fuselage. A "fuselage," for the purposes of this disclosure, refers to a main body of an aircraft 100, or in other words, an entirety of the aircraft 100 except for nose, wings, empennage, nacelles, and control surfaces. In some cases, fuselage may contain an aircraft's payload. At least a fuselage may comprise structural components that physically support a shape and structure of an aircraft 100. Structural components may take a plurality of forms, alone or in combination with other types. Structural components vary depending on construction type of aircraft 100 and specifically, fuselage. A fuselage 112 may include a truss structure. A truss structure may be used with a lightweight aircraft. A truss structure may include welded steel tube trusses. A "truss," as used in this disclosure, is an assembly of beams that create a rigid structure, for example without limitation including combinations of triangles to create three-dimensional shapes. A truss structure may include wood construction in place of steel tubes, or a combination thereof. In some embodiments, structural components can comprise steel tubes and/or wood beams. An aircraft skin may be layered over a body shape constructed by trusses. Aircraft skin may comprise a plurality of materials such as plywood sheets, aluminum, fiberglass, and/or carbon fiber.

With continued reference to FIG. 1, in embodiments, at least a fuselage may comprise geodesic construction. Geodesic structural elements may include stringers wound about formers (which may be alternatively called station frames) in opposing spiral directions. A "stringer," for the purposes of this disclosure is a general structural element that includes a long, thin, and rigid strip of metal or wood that is mechanically coupled to and spans the distance from, station frame to station frame to create an internal skeleton on which to mechanically couple aircraft skin. A former (or station frame) can include a rigid structural element that is disposed along a length of an interior of a fuselage orthogonal to a longitudinal (nose to tail) axis of aircraft 100. In some cases, a former forms a general shape of at least a fuselage. A former may include differing cross-sectional shapes at differing locations along a fuselage, as the former is a structural component that informs an overall shape of the fuselage. In embodiments, aircraft skin can be anchored to formers and strings such that an outer mold line of volume encapsulated by the formers and stringers comprises a same shape as aircraft 100 when installed. In other words, former (s) may form a fuselage's ribs, and stringers may form interstitials between the ribs. A spiral orientation of stringers about formers may provide uniform robustness at any point on an aircraft fuselage such that if a portion sustains damage, another portion may remain largely unaffected. Aircraft skin may be mechanically coupled to underlying stringers and formers and may interact with a fluid, such as air, to generate lift and perform maneuvers.

With continued reference to FIG. 1, according to some embodiments, a fuselage can comprise monocoque construction. Monocoque construction can include a primary structure that forms a shell (or skin in an aircraft's case) and supports physical loads. Monocoque fuselages are fuselages in which the aircraft skin or shell may also include a primary structure. In monocoque construction aircraft skin would support tensile and compressive loads within itself and true monocoque aircraft can be further characterized by an absence of internal structural elements. Aircraft skin in this construction method may be rigid and can sustain its shape with substantially no structural assistance form underlying skeleton-like elements. Monocoque fuselage may include aircraft skin made from plywood layered in varying grain directions, epoxy-impregnated fiberglass, carbon fiber, or any combination thereof.

With continued reference to FIG. 1, according to some embodiments, a fuselage may include a semi-monocoque construction. Semi-monocoque construction, as used in this disclosure, is used interchangeably with partially monocoque construction, discussed above. In semi-monocoque construction, a fuselage may derive some structural support from stressed aircraft skin and some structural support from underlying frame structure made of structural components. Formers or station frames can be seen running transverse to a long axis of fuselage with circular cutouts which may be used in real-world manufacturing for weight savings and for routing of electrical harnesses and other modern on-board systems. In a semi-monocoque construction, stringers may be thin, long strips of material that run parallel to a fuselage's long axis. Stringers can be mechanically coupled to formers permanently, such as with rivets. Aircraft skin can be mechanically coupled to stringers and formers permanently, such as by rivets as well. A person of ordinary skill in the art will appreciate that there are numerous methods for mechanical fastening of the aforementioned components like screws, nails, dowels, pins, anchors, adhesives like glue or epoxy, or bolts and nuts, to name a few. According to some embodiments, a subset of semi-monocoque construction may be unibody construction. Unibody, which is short for "unitized body" or alternatively "unitary construction," vehicles are characterized by a construction in which body, floor plan, and chassis form a single structure, for example an automobile. In the aircraft world, a unibody may include internal structural elements, like formers and stringers, constructed in one piece, integral to an aircraft skin. In some cases, stringers and formers may account for a bulk of any aircraft structure (excluding monocoque construction). Stringers and formers can be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin may be transferred to stringers. Location of said stringers greatly informs type of forces and loads applied to each and every stringer, all of which may be accounted for through design processes including, material selection, cross-sectional area, and mechanical coupling methods of each member. Similar methods may be performed for former assessment and design. In general, formers may be significantly larger in cross-sectional area and thickness, depending on location, than stringers. Both stringers and formers may comprise aluminum, aluminum alloys, graphite epoxy composite, steel alloys, titanium, or an undisclosed material alone or in combination.

With continued reference to FIG. 1, stressed skin, when used in semi-monocoque construction, may bear partial, yet significant, load. In other words, an internal structure, whether it be a frame of welded tubes, formers and stringers, or some combination, is not sufficiently strong enough by design to bear all loads. The concept of stressed skin is applied in monocoque and semi-monocoque construction methods of at least a fuselage and/or BWB 104. In some cases, monocoque may be considered to include substantially only structural skin, and in that sense, aircraft skin undergoes stress by applied aerodynamic fluids imparted by fluid. Stress as used in continuum mechanics can be described in pound-force per square inch (lbf/in$^2$) or Pascals (Pa). In semi-monocoque construction stressed skin bears part of aerodynamic loads and additionally imparts force on an underlying structure of stringers and formers.

With continued reference to FIG. 1, a fuselage may include an interior cavity. An interior cavity may include a volumetric space configurable to house passenger seats and/or cargo. An interior cavity may be configured to include receptacles for fuel tanks, batteries, fuel cells, or other energy sources as described herein. In some cases, a post may be supporting a floor (i.e., deck), or in other words a surface on which a passenger, operator, passenger, payload, or other object would rest on due to gravity when within an aircraft 100 is in its level flight orientation or sitting on ground. A post may act similarly to stringer in that it is configured to support axial loads in compression due to a load being applied parallel to its axis due to, for example, a heavy object being placed on a floor of aircraft 100. A beam may be disposed in or on any portion a fuselage that requires additional bracing, specifically when disposed transverse to another structural element, like a post, that would benefit from support in that direction, opposing applied force. A beam may be disposed in a plurality of locations and orientations within a fuselage as necessitated by operational and constructional requirements.

With continued reference to FIG. 1, aircraft 100 may include at least a flight component 108. A flight component 108 may be consistent with any description of a flight component described in this disclosure, such as without limitation propulsors, control surfaces, rotors, paddle wheels, engines, propellers, wings, winglets, or the like. For the purposes of this disclosure, at least a "flight component" is at least one element of an aircraft 100 configured to manipulate a fluid medium such as air to propel, control, or maneuver an aircraft. In non-limiting examples, at least a flight component may include a rotor mechanically connected to a rotor shaft of an electric motor further mechanically affixed to at least a portion of aircraft 100. In some embodiments, at least a flight component 108 may include a propulsor, for example a rotor attached to an electric motor configured to produce shaft torque and in turn, create thrust. As used in this disclosure, an "electric motor" is an electrical machine that converts electric energy into mechanical work.

With continued reference to FIG. 1, for the purposes of this disclosure, "torque," is a twisting force that tends to cause rotation. Torque may be considered an effort and a rotational analogue to linear force. A magnitude of torque of a rigid body may depend on three quantities: a force applied, a lever arm vector connecting a point about which the torque is being measured to a point of force application, and an angle between the force and the lever arm vector. A force applied perpendicularly to a lever multiplied by its distance from the lever's fulcrum (the length of the lever arm) is its torque. A force of three newtons applied two meters from the fulcrum, for example, exerts the same torque as a force of one newton applied six meters from the fulcrum. In some cases, direction of a torque can be determined by using a right-hand grip rule which states: if fingers of right hand are curled from a direction of lever arm to direction of force, then thumb points in a direction of the torque. One of ordinary skill in the art would appreciate that torque may be represented as a vector, consistent with this disclosure, and therefore may include a magnitude and a direction. "Torque" and "moment" are used interchangeably within this disclosure. Any torque command or signal within this disclosure may include at least the steady state torque to achieve the torque output to at least a propulsor.

With continued reference to FIG. 1, at least a flight component may be one or more devices configured to affect aircraft's 100 attitude. "Attitude," for the purposes of this disclosure, is the relative orientation of a body, in this case aircraft 100, as compared to earth's surface or any other reference point and/or coordinate system. In some cases, attitude may be displayed to pilots, personnel, remote users, or one or more computing devices in an attitude indicator, such as without limitation a visual representation of a horizon and its relative orientation to aircraft 100. A plurality of attitude datums may indicate one or more measurements relative to an aircraft's pitch, roll, yaw, or throttle compared to a relative starting point. One or more sensors may measure or detect an aircraft's 100 attitude and establish one or more attitude datums. An "attitude datum," for the purposes of this disclosure, refers to at least an element of data identifying an attitude of an aircraft 100.

With continued reference to FIG. 1, in some cases, aircraft 100 may include at least a pilot control. As used in this disclosure, a "pilot control," is an interface device that allows an operator, human or machine, to control a flight component of an aircraft. Pilot control may be communicatively connected to any other component presented in aircraft 100, the communicative connection may include redundant connections configured to safeguard against single-point failure. In some cases, a plurality of attitude datums may indicate a pilot's instruction to change heading and/or trim of an aircraft 100. Pilot input may indicate a pilot's instruction to change an aircraft's pitch, roll, yaw, throttle, and/or any combination thereof. Aircraft trajectory may be manipulated by one or more control surfaces and propulsors working alone or in tandem consistent with the entirety of this disclosure. "Pitch," for the purposes of this disclosure refers to an aircraft's angle of attack that is a difference between a plane including at least a portion of both wings of the aircraft running nose to tail and a horizontal flight trajectory. For example, an aircraft may pitch "up" when its nose is angled upward compared to horizontal flight, as in a climb maneuver. In another example, an aircraft may pitch "down," when its nose is angled downward compared to horizontal flight, like in a dive maneuver. In some cases, angle of attack may not be used as an input, for instance pilot input, to any system disclosed herein; in such circumstances proxies may be used such as pilot controls, remote controls, or sensor levels, such as true airspeed sensors, pitot tubes, pneumatic/hydraulic sensors, and the like. "Roll," for the purposes of this disclosure, refers to an aircraft's position about its longitudinal axis that is to say that when an aircraft rotates about its axis from its tail to its nose, and one side rolls upward, as in a banking maneuver. "Yaw," for the purposes of this disclosure, refers to an aircraft's turn angle, when an aircraft rotates about an imaginary vertical axis intersecting center of earth and aircraft 100. "Throttle," for the purposes of this disclosure, refers to an aircraft outputting an amount of thrust from a propulsor. In context of a pilot input, throttle may refer to a pilot's input to increase or decrease thrust produced by at least a propulsor. Flight components 108 may receive and/or transmit signals, for example an aircraft command signal. Aircraft command signal may include any signal described in this disclosure, such as without limitation electrical signal, optical signal, pneumatic signal, hydraulic signal, and/or mechanical signal. In some cases, an aircraft command may be a function of a signal from a pilot control. In some cases, an aircraft command may include or be determined as a function of a pilot command. For example, aircraft commands may be determined as a function of a mechanical movement of a throttle. Signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Pilot control may include circuitry, computing devices, electronic components or a combination thereof that translates pilot input into a signal configured to be transmitted to another electronic component. In some cases, a plurality of attitude commands may be determined as a function of an input to a pilot control. A plurality of attitude commands may include a total attitude command datum, such as a combination of attitude adjustments represented by one or a certain number of combinatorial datums. A plurality of attitude commands may include individual attitude datums representing total or relative change in attitude measurements relative to pitch, roll, yaw, and throttle.

With continued reference to FIG. 1, in some embodiments, pilot control may include at least a sensor. As used in this disclosure, a "sensor" is a device that detects a phenomenon. In some cases, a sensor may detect a phenomenon and transmit a signal that is representative of the phenomenon. At least a sensor may include, torque sensor, gyroscope, accelerometer, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. For the purposes of the disclosure, a "torque datum" is one or more elements of data representing one or more parameters detailing power output by one or more propulsors, flight components, or other elements of an electric aircraft. A torque datum may indicate the torque output of at least a flight component 108. At least a flight component may include any propulsor as described herein. In embodiment, at least a flight component 108 may include an electric motor, a propeller, a jet engine, a paddle wheel, a rotor, turbine, or any other mechanism configured to manipulate a fluid medium to propel an aircraft as described herein, an embodiment of at least a sensor may include or be included in, a sensor suite. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of a battery management system and/or user to detect phenomenon is maintained and in a non-limiting example, a user alter aircraft usage pursuant to sensor readings.

With continued reference to FIG. 1, at least a sensor may include a moisture sensor. "Moisture," as used in this disclosure, is the presence of water, this may include vaporized water in air, condensation on the surfaces of objects, or concentrations of liquid water. Moisture may include humidity. "Humidity," as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity," for the purposes of this disclosure, is expressed as a percentage, indicating a present stat of absolute humidity relative to a maximum humidity given the same temperature. "Specific humidity," for the purposes of this disclosure, is the ratio of water vapor mass to total moist air parcel mass, where parcel is a given portion of a gaseous medium. A moisture sensor may be psychrometer. A moisture sensor may be a hygrometer. A moisture sensor may be configured to act as or include a humidistat. A "humidistat," for the purposes of this disclosure, is a humidity-triggered switch, often used to control another electronic device. A moisture sensor may use capacitance to measure relative humidity and include in itself, or as an external component, include a device to convert relative humidity measurements to absolute humidity measurements. "Capacitance," for the purposes of this disclosure, is the ability of a system to store an electric charge, in this case the system is a parcel of air which may be near, adjacent to, or above a battery cell.

With continued reference to FIG. 1, at least a sensor may include electrical sensors. An electrical sensor may be configured to measure voltage across a component, electrical current through a component, and resistance of a component. Electrical sensors may include separate sensors to measure each of the previously disclosed electrical characteristics such as voltmeter, ammeter, and ohmmeter, respectively. One or more sensors may be communicatively coupled to at least a pilot control, the manipulation of which, may constitute at least an aircraft command. Signals may include electrical, electromagnetic, visual, audio, radio waves, or another undisclosed signal type alone or in combination. At least a sensor communicatively connected to at least a pilot control may include a sensor disposed on, near, around or within at least pilot control. At least a sensor may include a motion sensor. "Motion sensor," for the purposes of this disclosure refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. At least a sensor may include, torque sensor, gyroscope, accelerometer, torque sensor, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings.

With continued reference to FIG. 1, at least a flight component may include wings, empennages, nacelles, control surfaces, fuselages, and landing gear, among others, to name a few. In embodiments, an empennage may be disposed at the aftmost point of an aircraft body 104. Empennage may comprise a tail of aircraft 100, further comprising rudders, vertical stabilizers, horizontal stabilizers, stabilators, elevators, trim tabs, among others. At least a portion of empennage may be manipulated directly or indirectly by pilot commands to impart control forces on a fluid in which the aircraft 100 is flying. Manipulation of these empennage control surfaces may, in part, change an aircraft's heading in pitch, roll, and yaw. Wings comprise may include structures which include airfoils configured to create a pressure differential resulting in lift. Wings are generally disposed on a left and right side of aircraft 100 symmetrically, at a point between nose and empennage. Wings may comprise a plurality of geometries in planform view, swept swing, tapered, variable wing, triangular, oblong, elliptical, square, among others. Wings may be blended into the body of the aircraft such as in a BWB 104 aircraft 100 where no strong delineation of body and wing exists. A wing's cross section geometry may comprise an airfoil. An "airfoil" as used in this disclosure, is a shape specifically designed such that a fluid flowing on opposing sides of it exert differing levels of pressure against the airfoil. In embodiments, a bottom surface of an aircraft can be configured to generate a greater pressure than does a top surface, resulting in lift. A wing may comprise differing and/or similar cross-sectional geometries over its cord length, e.g. length from wing tip to where wing meets the aircraft's body. One or more wings may be symmetrical about an aircraft's longitudinal plane, which comprises a longitudinal or roll axis reaching down a center of the aircraft through the nose and empennage, and the aircraft's yaw axis. In some cases, wings may comprise controls surfaces configured to be commanded by a pilot and/or autopilot to change a wing's geometry and therefore its interaction with a fluid medium. Flight component 108 may include control surfaces. Control surfaces may include without limitation flaps, ailerons, tabs, spoilers, and slats, among others. In some cases, control surfaces may be disposed on wings in a plurality of locations and arrangements. In some cases, control surfaces may be disposed at leading and/or trailing edges of wings, and may be configured to deflect up, down, forward, aft, or any combination thereof.

In some cases, flight component 108 may include a winglet. For the purposes of this disclosure, a "winglet" is a flight component configured to manipulate a fluid medium and is mechanically attached to a wing or aircraft and may alternatively called a "wingtip device." Wingtip devices may be used to improve efficiency of fixed-wing aircraft by reducing drag. Although there are several types of wingtip devices which function in different manners, their intended effect may be to reduce an aircraft's drag by partial recovery of tip vortex energy. Wingtip devices can also improve aircraft handling characteristics and enhance safety for aircraft 100. Such devices increase an effective aspect ratio of a wing without greatly increasing wingspan. Extending wingspan may lower lift-induced drag but would increase parasitic drag and would require boosting the strength and weight of the wing. As a result according to some aeronautic design equations, a maximum wingspan made be determined above which no net benefit exits from further increased span. There may also be operational considerations that limit the allowable wingspan (e.g., available width at airport gates).

Wingtip devices, in some cases, may increase lift generated at wingtip (by smoothing airflow across an upper wing near the wingtip) and reduce lift-induced drag caused by wingtip vortices, thereby improving a lift-to-drag ratio. This increases fuel efficiency in powered aircraft and increases cross-country speed in gliders, in both cases increasing range. U.S. Air Force studies indicate that a given improvement in fuel efficiency correlates directly and causally with increase in an aircraft's lift-to-drag ratio. The term "winglet" has previously been used to describe an additional lifting surface on an aircraft, like a short section between wheels on fixed undercarriage. An upward angle (i.e., cant) of a winglet, its inward or outward angle (i.e., toe), as well as its size and shape are selectable design parameters which may be chosen for correct performance in a given application. A wingtip vortex, which rotates around from below a wing, strikes a cambered surface of a winglet, generating a force that angles inward and slightly forward. A winglet's relation to a wingtip vortex may be considered analogous to sailboat sails when sailing to windward (i.e., close-hauled). Similar to the close-hauled sailboat's sails, winglets may convert some of what would otherwise-be wasted energy in a wingtip vortex to an apparent thrust. This small contribution can be worthwhile over the aircraft's lifetime. Another potential benefit of winglets is that they may reduce an intensity of wake vortices. Wake vortices may trail behind an aircraft 100 and pose a hazard to other aircraft. Minimum spacing requirements between aircraft at airports are largely dictated by hazards, like those from wake vortices. Aircraft are classified by weight (e.g., "Light," "Heavy," and the like) often base upon vortex strength, which grows with an aircraft's lift coefficient. Thus, associated turbulence is greatest at low speed and high weight, which may be produced at high angle of attack near airports. Winglets and wingtip fences may also increase efficiency by reducing vortex interference with laminar airflow near wingtips, by moving a confluence of low-pressure air (over wing) and high-pressure air (under wing) away from a surface of the wing. Wingtip vortices create turbulence, which may originate at a leading edge of a wingtip and propagate backwards and inboard. This turbulence may delaminate airflow over a small triangular section of an outboard wing, thereby frustrating lift in that area. A fence/winglet drives an area where a vortex forms upward away from a wing surface, as the resulting vortex is repositioned to a top tip of the winglet.

With continued reference to FIG. 1, aircraft 100 may include an energy source. Energy source may include any device providing energy to at least a flight component 108, for example at least a propulsors. Energy source may include, without limitation, a generator, a photovoltaic device, a fuel cell such as a hydrogen fuel cell, direct methanol fuel cell, and/or solid oxide fuel cell, or an electric energy storage device; electric energy storage device may include without limitation a battery, a capacitor, and/or inductor. The energy source and/or energy storage device may include at least a battery, battery cell, and/or a plurality of battery cells connected in series, in parallel, or in a combination of series and parallel connections such as series connections into modules that are connected in parallel with other like modules. Battery and/or battery cell may include, without limitation, Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode. In embodiments, the energy source may be used to provide electrical power to an electric or hybrid propulsor during moments requiring high rates of power output, including without limitation takeoff, landing, thermal de-icing and situations requiring greater power output for reasons of stability, such as high turbulence situations. In some cases, battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. A person of ordinary skill in the art, upon reviewing the entirety of this disclosure, will be aware of various devices of components that may be used as an energy source.

With continued reference to FIG. 1, in further non-limiting embodiments, an energy source may include a fuel store. As used in this disclosure, a "fuel store" is an aircraft component configured to store a fuel. In some cases, a fuel store may include a fuel tank. Fuel may include a liquid fuel, a gaseous fluid, a solid fuel, and fluid fuel, a plasma fuel, and the like. As used in this disclosure, a "fuel" may include any substance that stores energy. Exemplary non-limiting fuels include hydrocarbon fuels, petroleum-based fuels, synthetic fuels, chemical fuels, Jet fuels (e.g., Jet-A fuel, Jet-B fuel, and the like), kerosene-based fuel, gasoline-based fuel, an electrochemical-based fuel (e.g., lithium-ion battery), a hydrogen-based fuel, natural gas-based fuel, and the like. As described in greater detail below fuel store may be located substantially within blended wing body 104 of aircraft 100, for example without limitation within a wing portion 212 of blended wing body 108. Aviation fuels may include petroleum-based fuels, or petroleum and synthetic fuel blends, used to power aircraft 100. In some cases, aviation fuels may have more stringent requirements than fuels used for ground use, such as heating and road transport. Aviation fuels may contain additives to enhance or maintain properties important to fuel performance or handling. Fuel may be kerosene-based (JP-8 and Jet A-1), for example for gas turbine-powered aircraft. Piston-engine aircraft may use gasoline-based fuels and/or kerosene-based fuels (for example for Diesel engines). In some cases, specific energy may be considered an important criterion in selecting fuel for an aircraft 100. Liquid fuel may include Jet-A. Presently Jet-A powers modern commercial airliners and is a mix of extremely refined kerosene and burns at temperatures at or above 49° ° C. (120° F.). Kerosene-based fuel has a much higher flash point than gasoline-based fuel, meaning that it requires significantly higher temperature to ignite.

With continued reference to FIG. 1, modular aircraft 100 may include an energy source which may include a fuel cell. As used in this disclosure, a "fuel cell" is an electrochemical device that combines a fuel and an oxidizing agent to create electricity. In some cases, fuel cells are different from most batteries in requiring a continuous source of fuel and oxygen (usually from air) to sustain the chemical reaction, whereas in a battery the chemical energy comes from metals and their ions or oxides that are commonly already present in the battery, except in flow batteries. Fuel cells can produce electricity continuously for as long as fuel and oxygen are supplied. In some cases, oxygen may be provided by way of ambient or atmospheric air. Alternatively or additionally, in some cases, aircraft 100 may additionally include at least an oxygen tank configured to store oxygen for use with fuel cell. In some cases, oxygen may be stored within at least an oxygen tank in a gaseous state.

With continued reference to FIG. 1, in some embodiments, fuel cells may consist of different types. Commonly a fuel cell consists of an anode, a cathode, and an electrolyte that allows ions, often positively charged hydrogen ions (protons), to move between two sides of the fuel cell. At anode, a catalyst causes fuel to undergo oxidation reactions that generate ions (often positively charged hydrogen ions) and electrons. Ions move from anode to cathode through electrolyte. Concurrently, electrons may flow from anode to cathode through an external circuit, producing direct current electricity. At cathode, another catalyst causes ions, electrons, and oxygen to react, forming water and possibly other products. Fuel cells may be classified by type of electrolyte used and by difference in startup time ranging from 1 second for proton-exchange membrane fuel cells (PEM fuel cells, or PEMFC) to 10 minutes for solid oxide fuel cells (SOFC). In some cases, energy source may include a related technology, such as flow batteries. Within a flow battery fuel can be regenerated by recharging. Individual fuel cells produce relatively small electrical potentials, about 0.7 volts. Therefore, in some cases, fuel cells may be "stacked," or placed in series, to create sufficient voltage to meet an application's requirements. In addition to electricity, fuel cells may produce water, heat and, depending on the fuel source, very small amounts of nitrogen dioxide and other emissions. Energy efficiency of a fuel cell is generally between 40 and 90%.

With continued reference to FIG. 1, fuel cell may include an electrolyte. In some cases, electrolyte may define a type of fuel cell. Electrolyte may include any number of substances like potassium hydroxide, salt carbonates, and phosphoric acid. Commonly a fuel cell is fueled by hydrogen. Fuel cell may feature an anode catalyst, like fine platinum powder, which breaks down fuel into electrons and ions. Fuel cell may feature a cathode catalyst, often nickel, which converts ions into waste chemicals, with water being the most common type of waste. A fuel cell may include gas diffusion layers that are designed to resist oxidization.

With continued reference to FIG. 1, aircraft 100 may include an energy source which may include a cell such as a battery cell, or a plurality of battery cells making a battery module. An energy source may be a plurality of energy sources. The module may include batteries connected in parallel or in series or a plurality of modules connected either in series or in parallel designed to deliver both the power and energy requirements of the application. Connecting batteries in series may increase the voltage of an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of an energy source may be based on the individual battery cell performance, or an extrapolation based on the measurement of at least an electrical parameter. In an embodiment where an energy source includes a plurality of battery cells, the overall power output capacity may be dependent on the electrical parameters of each individual cell. If one cell experiences high self-discharge during demand, power drawn from an energy source may be decreased to avoid damage to the weakest cell. An energy source may further include, without limitation, wiring, conduit, housing, cooling system and battery management system. Persons skilled in the art will be aware, after reviewing the entirety of this disclosure, of many different components of an energy source.

With continued reference to FIG. 1, aircraft 100 may include multiple flight component 108 sub-systems, each of which may have a separate energy source. For instance, and without limitation, one or more flight components may have a dedicated energy source. Alternatively, or additionally, a plurality of energy sources may each provide power to two or more flight components 108, such as, without limitation, a "fore" energy source providing power to flight components located toward a front of an aircraft 100, while an "aft" energy source provides power to flight components located toward a rear of the aircraft 100. As a further non-limiting example, a flight component of group of flight components may be powered by a plurality of energy sources. For example, and without limitation, two or more energy sources may power one or more flight components; two energy sources may include, without limitation, at least a first energy source having high specific energy density and at least a second energy source having high specific power density, which may be selectively deployed as required for higher-power and lower-power needs. Alternatively, or additionally, a plurality of energy sources may be placed in parallel to provide power to the same single propulsor or plurality of propulsors. Alternatively, or additionally, two or more separate propulsion subsystems may be joined using intertie switches (not shown) causing the two or more separate propulsion subsystems to be treatable as a single propulsion subsystem or system, for which potential under load of combined energy sources may be used as the electric potential. Persons skilled in the art, upon reviewing the entirety of this disclosure, will be aware of various combinations of energy sources that may each provide power to single or multiple propulsors in various configurations.

With continued reference to FIG. 1, aircraft 100 may include a flight component 108 that includes at least a nacelle. For the purposes of this disclosure, a "nacelle" is a streamlined body housing, which is sized according to that which is houses, such as without limitation an engine, a fuel store, or a flight component. When attached by a pylon entirely outside an airframe 104 a nacelle may sometimes be referred to as a pod, in which case an engine within the nacelle may be referred to as a podded engine. In some cases an aircraft cockpit may also be housed in a nacelle, rather than in a conventional fuselage. At least a nacelle may substantially encapsulate a propulsor, which may include a motor or an engine. At least a nacelle may be mechanically connected to at least a portion of aircraft 100 partially or wholly enveloped by an outer mold line of the aircraft 100. At least a nacelle may be designed to be streamlined. At least a nacelle may be asymmetrical about a plane comprising the longitudinal axis of the engine and the yaw axis of modular aircraft 100.

With continued reference to FIG. 1, a flight component may include a propulsor. A "propulsor," as used herein, is a component or device used to propel a craft by exerting force on a fluid medium, which may include a gaseous medium such as air or a liquid medium such as water. For the purposes of this disclosure, "substantially encapsulate" is the state of a first body (e.g., housing) surrounding all or most of a second body. A motor may include without limitation, any electric motor, where an electric motor is a device that converts electrical energy into mechanical work for instance by causing a shaft to rotate. A motor may be driven by direct current (DC) electric power; for instance, a motor may include a brushed DC motor or the like. A motor may be driven by electric power having varying or reversing voltage levels, such as alternating current (AC) power as produced by an alternating current generator and/or inverter, or otherwise varying power, such as produced by a switching power source. A motor may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers or other components for regulating motor speed, rotation direction, torque, and/or dynamic braking. Motor may include or be connected to one or more sensors detecting one or more conditions of motor; one or more conditions may include, without limitation, voltage levels, electromotive force, current levels, temperature, current speed of rotation, position sensors, and the like. For instance, and without limitation, one or more sensors may be used to detect back-EMF, or to detect parameters used to determine back-EMF, as described in further detail below. One or more sensors may include a plurality of current sensors, voltage sensors, and speed or position feedback sensors. One or more sensors may communicate a current status of motor to a flight controller and/or a computing device; computing device may include any computing device as described in this disclosure, including without limitation, a flight controller.

With continued reference to FIG. 1, a motor may be connected to a thrust element. Thrust element may include any device or component that converts mechanical work, for example of a motor or engine, into thrust in a fluid medium. Thrust element may include, without limitation, a device using moving or rotating foils, including without limitation one or more rotors, an airscrew or propeller, a set of airscrews or propellers such as contra-rotating propellers or co-rotating propellers, a moving or flapping wing, or the like. Thrust element may include without limitation a marine propeller or screw, an impeller, a turbine, a pump-jet, a paddle or paddle-based device, or the like. Thrust element may include a rotor. Persons skilled in the art, upon reviewing the entirety of this disclosure, will be aware of various devices that may be used as thrust element. A thrust element may include any device or component that converts mechanical energy (i.e., work) of a motor, for instance in form of rotational motion of a shaft, into thrust within a fluid medium. As another non-limiting example, a thrust element may include an eight-bladed pusher propeller, such as an eight-bladed propeller mounted behind the engine to ensure the drive shaft is in compression.

With continued reference to FIG. 1, in non-limiting embodiments, flight component 108 may include an airbreathing engine such as a jet engine, turbojet engine, turboshaft engine, ramjet engine, scramjet engine, hybrid propulsion system, turbofan engine, or the like. Flight component 108 may be fueled by any fuel described in this disclosure, for instance without limitation Jet-A, Jet-B, diesel fuel, gasoline, or the like. In non-limiting embodiments, a jet engine is a type of reaction engine discharging a fast-moving jet that generates thrust by jet propulsion. While this broad definition can include rocket, water jet, and hybrid propulsion, the term jet engine, in some cases, refers to an internal combustion airbreathing jet engine such as a turbojet, turbofan, ramjet, or pulse jet. In general, jet engines are internal combustion engines. As used in this disclosure, a "combustion engine" is a mechanical device that is configured to convert mechanical work from heat produced by combustion of a fuel. In some cases, a combustion engine may operate according to an approximation of a thermodynamic cycle, such as without limitation a Carnot cycle, a Cheng cycle, a Combined cycle, a Brayton cycle, an Otto cycle, an Allam power cycle, a Kalina cycle, a Rankine cycle, and/or the like. In some cases, a combustion engine may include an internal combustion engine. An internal combustion engine may include heat engine in which combustion of fuel occurs with an oxidizer (usually air) in a combustion chamber that comprises a part of a working fluid flow circuit. Exemplary internal combustion engines may without limitation a reciprocating engine (e.g., 4-stroke engine), a combustion turbine engine (e.g., jet engines, gas turbines, Brayton cycle engines, and the like), a rotary engine (e.g., Wankel engines), and the like. In non-limiting embodiments, airbreathing jet engines feature a rotating air compressor powered by a turbine, with leftover power providing thrust through a propelling nozzle—this process may be known as a Brayton thermodynamic cycle. Jet aircraft may use such engines for long-distance travel. Early jet aircraft used turbojet engines that were relatively inefficient for subsonic flight. Most modern subsonic jet aircraft use more complex high-bypass turbofan engines. In some cases, they give higher speed and greater fuel efficiency than piston and propeller aeroengines over long distances. A few air-breathing engines made for highspeed applications (ramjets and scramjets) may use a ram effect of aircraft's speed instead of a mechanical compressor. An airbreathing jet engine (or ducted jet engine) may emit a jet of hot exhaust gases formed from air that is forced into the engine by several stages of centrifugal, axial or ram compression, which is then heated and expanded through a nozzle. In some cases, a majority of mass flow through an airbreathing jet engine may be provided by air taken from outside of the engine and heated internally, using energy stored in the form of fuel. In some cases, a jet engine may include are turbofans. Alternatively and/or additionally, jet engine may include a turbojets. In some cases, a turbofan may use a gas turbine engine core with high overall pressure ratio (e.g., 40:1) and high turbine entry temperature (e.g., about 1800 K) and provide thrust with a turbine-powered fan stage. In some cases, thrust may also be at least partially provided by way of pure exhaust thrust (as in a turbojet engine). In some cases, a turbofan may have a high efficiency, relative to a turbojet. In some cases, a jet engine may use simple ram effect (e.g., ramjet) or pulse combustion (e.g., pulsejet) to give compression. Persons skilled in the art, upon reviewing the entirety of this disclosure, will be aware of various devices that may be used as a thrust element.

With continued reference to FIG. 1, an aircraft 100 may include a flight controller. As used in this disclosure, a "flight controller" is a device that generates signals for controlling at least a flight component 108 of an aircraft 100. In some cases, a flight controller includes electronic circuitry, such as without limitation a digital signal processor (DSP), an application-specific integrated circuit (ASIC), and/or a computing device. Flight controller may use sensor feedback to calculate performance parameters of motor, including without limitation a torque versus speed operation envelope. Persons skilled in the art, upon reviewing the entirety of this disclosure, will be aware of various devices and/or components that may be used as or included in a motor or a circuit operating a motor, as used and described in this disclosure.

With continued reference to FIG. 1, computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of system and/or computing device.

With continued reference to FIG. 1, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 2:
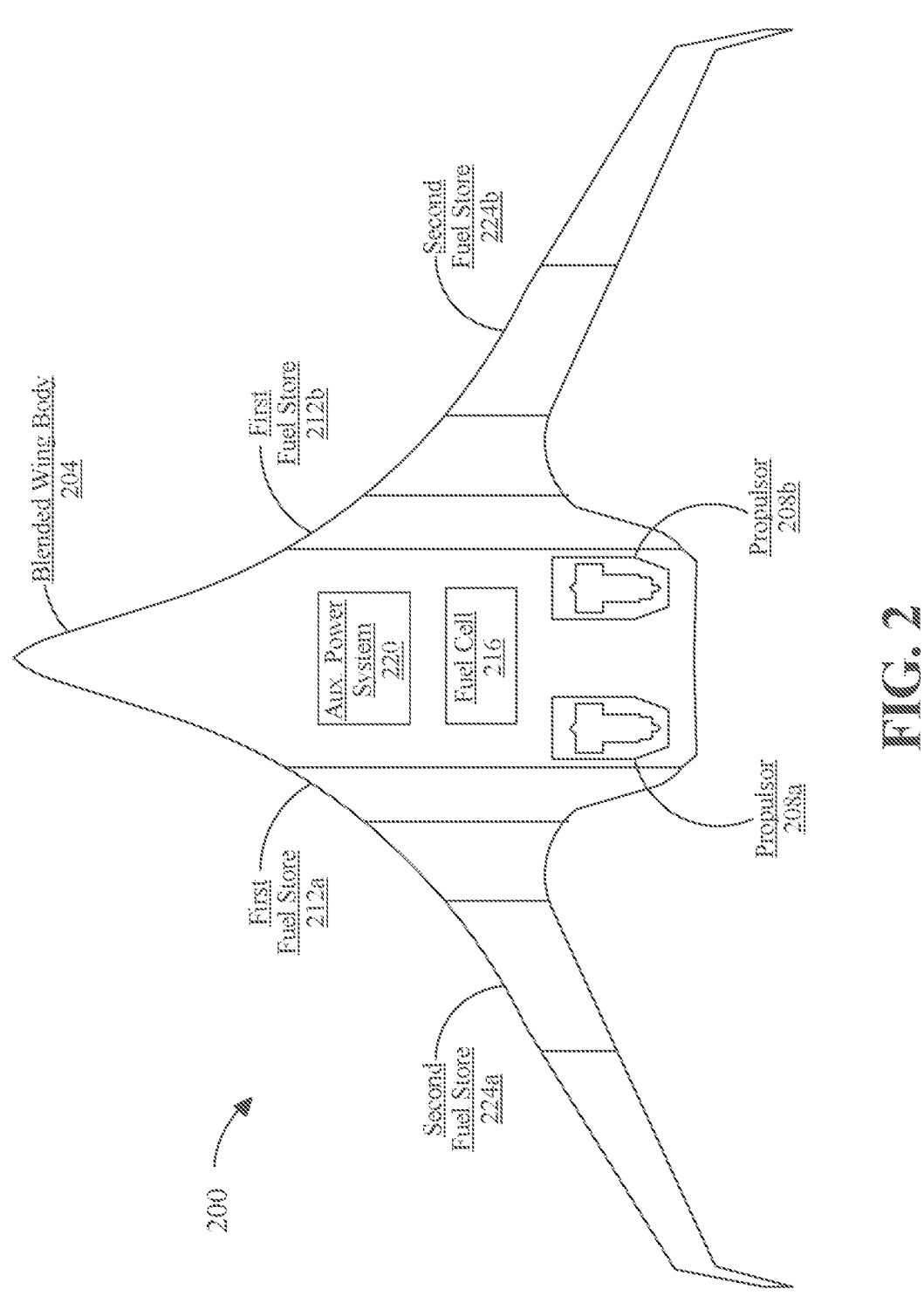
FIG. 2 illustrates a diagram of an exemplary blended wing body aircraft with a fuel cell.

Referring now to FIG. 2, an exemplary top-down diagram of an exemplary blended wing aircraft 200 is illustrated. Aircraft 200 may include a blended wing body 204. As described above, a blended wing body (BWB) is a fixed-wing aircraft body having no clear demarcation between wings and a main body of the aircraft. For example, a BWB 204 aircraft may have distinct wing and body structures, which are smoothly blended together with no clear dividing line or boundary feature between wing and fuselage. As used in this disclosure, a "transitional" portion of blended wing body 204 is the portion of the blended wing body 204 that includes the aircraft body between wing and a main body.

With continued reference to FIG. 2, aircraft 200 may include at least a propulsor 208*a-b* mechanically affixed to the aircraft 200. In some cases, at least a propulsor 208*a-b* may be configured to propel aircraft 200. Propulsor may include any propulsor described in this disclosure, for example with reference to FIG. 1. In some embodiments, at least a propulsor 208*a-b* may include at least a combustion engine that burns first fuel and produces mechanical work. Resulting mechanical work may be used to power at least a propulsor 208*a-b*. In some embodiments, at least a propulsor 208*a-b* may include at least an electric motor operatively connected with fuel cell 216. Propulsor 208*a-b* may be operatively connected to fuel cell 216 by way of electrical communication, for example through one or more conductors. In some cases, at least a fuel cell 216 may be configured to power at least an electric motor of propulsor 208*a-b*. In some embodiments, at least a propulsor 208*a-b* may include both a combustion engine and an electric motor.

With continued reference to FIG. 2, aircraft 200 may include at least a first fuel store 212*a-b*. At least a first fuel store 212*a-b* may be configured to store a first fuel. First fuel may include any fuel taught in this disclosure, for example without limitation liquid hydrogen, liquid natural gas, gasoline-based fuels, kerosene-based fuels and the like. In some embodiments, first fuel store 212*a-b* may be at least partially located within a transitional portion of blended wing body 204. According to some embodiments, first fuel store may be configured to store one or more of liquid hydrogen and natural gas. For example, although weight energy density of liquid hydrogen is high, volume energy density of liquid hydrogen is lower than conventional aviation fuels. For this reason, in some cases, fuel store 212*a-b* may be located within a transitional portion of blended wing body 204 as greater volume for storage is available here, for example when compared to a wing portion. In some cases, liquid nitrogen may need to be stored at extremely cold temperatures, for instance without limitation at a temperature below −252° C. As liquid hydrogen warms it boils off and is lost. As a result, boil off rate is considered when employing liquid hydrogen as a fuel. In some cases, first fuel store 212, or any fuel store containing liquid hydrogen, may be heavily insulated. For example, in some cases, fuel store may include an inner wall and an outer wall with a vacuum chamber disposed between the inner wall and the outer wall. Vacuum within vacuum chamber prevents convective and conductive heat loss between inner and outer wall, so that substantially only radiative heat transfer may be possible between the two walls dramatically slowing heat transfer (and heating). Alternatively or additionally, in some cases, an insulation may be located between inner wall and outer wall of fuel store. Exemplary non-limiting insulations include high loft materials, silica aerogel, polyurethane, polystyrene, fiberglass, and the like. In some cases, a reflective material may be used within a wall of fuel store to slow radiative heat transfer, for example without limitation metallic materials with high polish like foil.

With continued reference to FIG. 2, in some cases, a voluminous fuel store 212*a-b*, for instance located within a transitional portion of blended wing body 204, may be advantageous for liquid hydrogen (or liquid natural gas) storage as it slows a rate of temperature rise of fuel. For instance, heat transfer is a function of surface area of fuel store and may be understood according to Newton's Law of Cooling. Whereas, thermal compliance is a function of mass (volume multiplied by density). As a fuel store increases in size, its volume increases more than surface area. This phenomenon may be understood as square-cube law, stated thus when an object undergoes a proportional increase in size, its new surface area is proportional to the square of the multiplier and its new volume is proportional to the cube of the multiplier. For example, imagine a cubic fuel store increases from a first length, $l_1$, to a second length, $l_2$. An area of fuel store may increase thus:

$$A_2 = A_1 \left(\frac{l_2}{l_1}\right)^2$$

and, a volume of fuel store increases thus:

$$V_2 = V_1 \left(\frac{l_2}{l_1}\right)^3$$

where $A_1$ is first surface area, $A_2$ is second surface area, $V_1$ is first volume, and $V_2$ is second volume. For example, a cube with a side length of 1 meter has a surface area of 6 $m^2$ and a volume of 1 $m^3$. If dimensions of cube were multiplied by 2, its surface area would be multiplied by the square of 2 and become 24 $m^2$. Its volume would be multiplied by cube of 2 and become 8 $m^3$. The original cube (1 m sides) has a surface area to volume ratio of 6:1. The larger (2 m sides) cube has a surface area to volume ratio of (24/8) 3:1. As dimensions increase, volume will continue to grow faster than surface area. Square-cube principle applies to all solids, not just cubes. In a non-limiting example, voluminous fuel store 212*a-b* including hydrogen may be large enough for an entire day's worth of electricity such that the hydrogen only needs to be refueled once a day.

With continued reference to FIG. 2, aircraft 200 may include at least a fuel cell 216. In some cases, at least a fuel cell 216 may be configured to combine first fuel with an oxidizing agent, such as oxygen to produce electricity. At least a fuel cell 216 may include any fuel cell described in this disclosure, including without limitation with reference to FIG. 1 above.

Still referring to FIG. 2, in some embodiments aircraft 200 may additionally include an auxiliary power system (APU) 220 operatively connected with at least a fuel cell 216. As used in this disclosure, an "auxiliary power system" is a power system, such as without limitation an electrical circuit or mechanical power source, that provides electrical energy to non-propulsor flight components of an aircraft. Exemplary non-limiting non-propulsor flight component include an avionic system, a flight control system, an environmental control system, and anti-ice system, a lighting system, a fuel system, a braking system, and/or a landing gear system. Auxiliary power system 220 may be operatively connected to fuel cell 216 by way of electrical communication, for example through one or more conductors. In some cases, at least a fuel cell 216 may be configured to power auxiliary power system 220. In a non-limiting example, APU may be powered using fuel cell 216 during boarding and deboarding, while fuel may be used for takeoff and rest of the flight. In some cases, auxiliary power system 220 may include a motor configured to convert electric energy to mechanical work. In some cases, motor may be used to operate a compressor, for instance of air conditioning or refrigeration system. In some cases, auxiliary power system 220 may include a motor that is configured to start a combustion engine of at least a propulsor 208a-b.

Still referring to FIG. 2, in some embodiments, aircraft 200 may additionally include a second fuel store 224a-b. In some cases, second fuel store 224a-b may be configured to store a second fuel. In some cases, second fuel may be different than a first fuel. Second fuel may include any fuel described in this disclosure, including without limitation kerosene-based fuels. Second fuel may include sustainable aviation fuel (SAF). In a non-limiting example, SAF may be used for portions of a flight in which there are environmental regulations. For example, and without limitation, aircraft 200 using first fuel may change fuels off the coast of California to second fuel before arrival to conform the California regulations. In another non-limiting example, aircraft 200 using first fuel may change fuels to second fuel to use a light fuel, such as hydrogen, at the end of a flight, which may allow heavier fuel to be used up first and allow for better fuel efficiency towards the end of the flight. In some cases, at least a propulsor 208a-b may include at least a combustion engine configured to burn second fuel thereby producing mechanical work, which is used to power the at least a propulsor 208a-b.

Still referring to FIG. 2, in some embodiments, one or more of first fuel store 212a-b and second fuel store 224a-b may include at least a fuel environment control mitigation. As used in this disclosure, a "fuel environment mitigation" is any design parameter selected to control an environmental factor associated with fuel within a fuel store. In some cases, fuel environment control mitigation may include a design parameter that affects one or more of fuel pressure, fuel temperature, fuel phase, and the like. For example, in some cases, a fuel environment control mitigation may include insulation to control fuel temperature. Additionally or alternatively, in some cases, fuel environment control mitigation may include a pressure vessel within which fuel pressure may be controlled.

Figure 3:
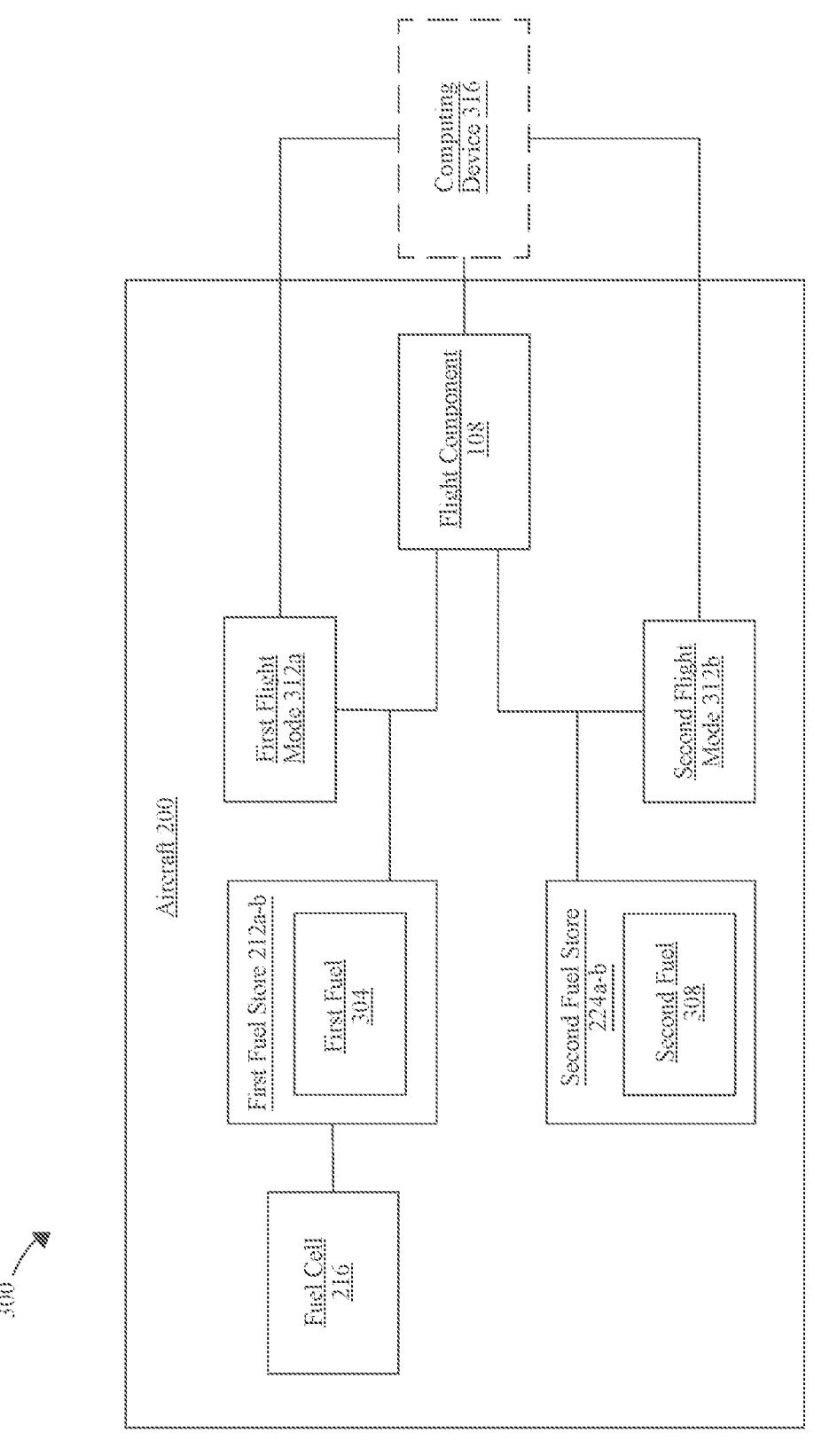
FIG. 3 illustrates a block diagram of an exemplary aircraft with a fuel cell.

Now referring to FIG. 3, a block diagram of an exemplary system 300 for controlling a flight boundary of an aircraft 200 is illustrated. System 300 includes aircraft 200, first fuel store 212a-b, second fuel store 224a-b, first fuel 304, second fuel 308, fuel cell 216, first flight mode 312a, second flight mode 312b, flight component 108, or the like. System 300 may include flight controller 316. The aircraft 200, first fuel store 212a-b, second fuel store 224a-b, first fuel 304, second fuel 308 and fuel cell 216 disclosed herein are described in detail above. The flight component 108 disclosed herein is further described in the entirety of this disclosure. As a non-limiting example, flight component 108 may include propulsor 208a-b, auxiliary power system 220, or the like. Flight component 108 is configured to propel, control or maneuver aircraft 200 to flight modes 312a-b.

With continued reference to FIG. 3, first fuel 304 of first fuel store 212a-b may be configured to be consumed during a first flight mode 312a of aircraft 200. A "flight mode," as used in this disclosure, is a type of flight an aircraft engages in. Flight modes 312 may include, but are not limited to, takeoff, cruising, climbing, cruising, descent, approach, landing, and any transition between thereof. Flight modes 312a-b may further include, but are not limited to, boarding, deboarding, on ground, or the like. In some embodiments, flight modes 312a-b may include a plurality of portions of an entire flight. As a non-limiting example, flight modes 312a-b may include first portion, second portion and third portion of an entire flight time. For example, and without limitation, if an entire flight time of aircraft 200 is 90 minutes, flight modes 312a-b may include first 30 minutes, second 30 minutes and third 30 minutes. For example, and without limitation, if an entire flight time of aircraft 200 is 90 minutes, flight modes 312a-b may include first 20 minutes, second 50 minutes and third 20 minutes. For example, and without limitation, if an entire flight time of aircraft 200 is 90 minutes, flight modes 312a-b may include first 70 minutes and second 20 minutes. The divided portion of flight time may vary. In some embodiments, flight modes 312a-b may include different portions of flight altitude. As a non-limiting example, flight modes 312a-b may include first portion including from the ground to 10,000 feet in the air, first portion including second portion including 10,001 feet to 30,000 feet, third portion including 30,000 feet or above, or the like. In some embodiments, flight modes 312a-b may include a plurality of flight modes 312a-b for different countries, states or places. As a non-limiting example, flight modes 312a-b may include a flight mode 312a-b for Canada, California, oceans, sea, mountain, or the like. In a non-limiting example, first flight mode 312a may include takeoff, landing, or any flight modes thereof. In some embodiments, first flight mode 312a may include a plurality of flight modes. As a non-limiting example, first flight mode 312a may include takeoff and landing. As another non-limiting example, first flight mode 312a may include on ground, takeoff, boarding, landing and deboarding. In some embodiments, flight mode 312a-b may include different portions of airspeed of aircraft 200. In some embodiments, flight mode 312a-b may include different temperature of environment of aircraft 200 during a flight.

Still referring to FIG. 3, second fuel 308 of second fuel store 224 is consumed during a second flight mode 312b of aircraft 200. In a non-limiting example, second flight mode 312b may include cruising, or any flight mode thereof. In a non-limiting example, second flight mode 312b may include a plurality of flight modes. As a non-limiting example, second flight mode 312b may include cruising and landing. In some embodiments, second flight mode 312b may be different than first flight mode 312a. For example, and without limitation, second flight mode 312b may include cruising while first flight mode 312a includes takeoff and landing. For example, and without limitation, first flight mode 312a may include first portion of flight altitude including from ground to 30,000 feet while second flight mode 312*b* includes third portion of flight altitude including 30,000 feet or above.

With continued reference to FIG. 3, in some embodiments, flight mode 312*a-b* and corresponding first fuel store 212*a-b* or second fuel store 224*a-b* or first fuel 304 or second fuel 308 that is used for flight mode 312*a-b* may be determined manually by a human or computing device 316 may automatically determine flight mode 312*a-b* and corresponding first fuel store 212*a-b* or second fuel store 224*a-b* or first fuel 304 or second fuel 308. In some embodiments, computing device 316 may include a flight controller. As a non-limiting example, a human disclosed herein may include any pilots, air traffic controllers, aerospace engineers, or the like. As used in this disclosure, a "flight controller" is a computing device of a plurality of computing devices dedicated to data storage, security, distribution of traffic for load balancing, and flight instruction. The flight controller disclosed herein is further described with respect to FIG. 4.

With continued reference to FIG. 3, in some embodiments, computing device 316 may be configured to receive sensor data from at least a sensor. For the purposes of this disclosure, "sensor data" is data obtained from a sensor. As a non-limiting example, sensor data may include data related to temperature, airspeed, altitude, pressure, humidity, or the like. For example, and without limitation, at least a sensor may transduce a detected phenomenon, such as without limitation, temperature, voltage, current, pressure, speed, motion, light, moisture, and the like, into a sensed signal. The at least a sensor may output the sensed signal. The at least a sensor may include any computing device as described in the entirety of this disclosure and configured to convert and/or translate a plurality of signals detected into electrical signals for further analysis and/or manipulation. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Any datum captured by the at least a sensor may include circuitry, computing devices, electronic components or a combination thereof that translates into at least an electronic signal configured to be transmitted to another electronic component. In a non-limiting embodiment, the at least a sensor may include a plurality of sensors comprised in a sensor suite. In one or more embodiments, and without limitation, the at least a sensor may include a plurality of sensors.

With continued reference to FIG. 3, in some embodiments, the at least a sensor may include a temperature sensor. For the purposes of this disclosure, a "temperature sensor" is a device that detects thermal energy and outputs an electrical signal as a function of the detection of thermal energy. As a non-limiting example, the temperature sensor may include thermocouples, thermistors, thermometers, passive infrared sensors, resistance temperature sensors (RTD's), semiconductor based integrated circuits (IC), a combination thereof or another undisclosed sensor type, alone or in combination. For the purposes of this disclosure and as would be appreciated by someone of ordinary skill in the art, "temperature" is a measure of the heat energy of a system. Temperature, as measured by any number or combinations of sensors, may be measured in Fahrenheit (° F.), Celsius (C.), Kelvin (° K), or another scale alone or in combination. The temperature measured by sensors may comprise electrical signals which are transmitted to their appropriate destination wireless or through a wired connection.

With continued reference to FIG. 3, in some embodiments, at least a sensor may include a force sensor. For the purposes of this disclosure, a "force sensor" is a sensor that that converts an input mechanical load, weight, tension, compression or pressure into an electrical output signal. As a non-limiting example, the force sensor may include a tension force sensor, compression force sensor, tension and compression force sensor, and the like. As another non-limiting example, the force sensor may include a strain gauge, load cell, piezoelectric sensor, capacitive sensor, magnetic sensor, and the like. In some embodiments, the force sensor may be configured to transform a pressure into an analogue electrical signal. In some embodiments, the force sensor may be configured to transform a force into a digital signal.

With continued reference to FIG. 3, in some embodiments, at least a sensor may include a pressure sensor. Pressure, for the purposes of this disclosure, and as would be appreciated by someone of ordinary skill in the art, is a measure of force required to stop a fluid from expanding and is usually stated in terms of force per unit area. The pressure sensor that may be included in at least a sensor may be configured to measure an atmospheric pressure and/or a change of atmospheric pressure. In some embodiments, the pressure sensor may include an absolute pressure sensor, a gauge pressure sensor, a vacuum pressure sensor, a differential pressure sensor, a sealed pressure sensor, and/or other unknown pressure sensors or alone or in a combination thereof. The pressor sensor may include a barometer. In some embodiments, the pressure sensor may be used to indirectly measure fluid flow, speed, water level, and altitude. In some embodiments, the pressure sensor may be configured to transform a pressure into an analogue electrical signal. In some embodiments, the pressure sensor may be configured to transform a pressure into a digital signal.

With continued reference to FIG. 3, in one or more embodiments, at least a sensor may include a moisture sensor. "Moisture," as used in this disclosure, is the presence of water, which may include vaporized water in air, condensation on the surfaces of objects, or concentrations of liquid water. Moisture may include humidity. "Humidity," as used in this disclosure, is the property of a gaseous medium (almost always air) to hold water in the form of vapor. In one or more embodiments, at least a sensor may include electrical sensors. Electrical sensors may be configured to measure voltage across a component, electrical current through a component, and resistance of a component. In one or more embodiments, at least a sensor may include thermocouples, thermistors, thermometers, infrared sensors, resistance temperature sensors (RTDs), semiconductor based integrated circuits (ICs), a combination thereof, or another undisclosed sensor type, alone or in combination.

With continued reference to FIG. 3, in some embodiments, at least a sensor may include an airspeed sensor. For the purposes of this disclosure, an "airspeed sensor" is instrument that measures the speed of an aircraft relative to the surrounding air. In some embodiments, the airspeed sensor may be configured to detect and transduce airspeed of an aircraft 200 into sensor data. In some embodiments, the airspeed sensor may be configured to transmit the sensor data to a computing device 316. The airspeed sensor may be analog or digital sensor. The airspeed sensor may measure the speed of an aircraft 200 using the differential between the pressure of still air (static pressure) and that of moving air compressed by the forward motion of the electric aircraft (ram pressure.) In some embodiments, the airspeed sensor may include a pitot tube. For the purposes of this disclosure, a "pitot tube" is instrument for measuring the velocity of a flowing fluid, such as without limitation air. The pitot tube may include a U-shaped apparatus with two ports, one perpendicular to the flow of air past the aircraft 200 (static port) and one facing directly into the flow (dynamic port). Mercury or a similar liquid may fill the bend in the pitot tube, forming parallel columns balanced by the air pressure on each side. When static and ram pressure are equal, the columns may have the same height. As the ram pressure increases, mercury on that side of the tube may be pushed back and the columns become imbalanced. The difference between the two columns may be calibrated to indicate the speed of the aircraft 200. In some embodiments, the airspeed sensor may include a pressure sensor. For the purposes of this disclosure, a "pressure sensor" is a measure of force required to stop a fluid from expanding and is usually stated in terms of force per unit area. The pressure sensor that may be included in at least a sensor may be configured to measure an atmospheric pressure and/or a change of atmospheric pressure. In some embodiments, the pressure sensor may include an absolute pressure sensor, a gauge pressure sensor, a vacuum pressure sensor, a differential pressure sensor, a sealed pressure sensor, and/or other unknown pressure sensors or alone or in a combination thereof. The pressor sensor may include a barometer. In some embodiments, the pressure sensor may be used to indirectly measure fluid flow, speed, water level, and altitude. In some embodiments, the pressure sensor may be configured to transform a pressure into an analogue electrical signal. In some embodiments, the pressure sensor may be configured to transform a pressure into a digital signal. The ports of the pitot tube may be connected to the pressure sensor. When the pitot tube is pointing forward on the aircraft 200, it may measure the difference between the pressure from dynamic and static port. When factoring in the temperature it may estimate the speed of the aircraft through air. In some embodiments, the airspeed sensor may include a temperature sensor.

Still referring to FIG. 3, in some embodiments, system 300 may include at least another sensor. Another sensor may include any other (non-gas and non-temperature) sensor described in this disclosure. Briefly, other sensors may include electrical sensors. As described in this disclosure, an "electrical sensor" is a device that is configured to detect an electrical parameter associated with an electrical phenomena. Exemplary non-limiting electrical sensors include voltmeters, amp-meters, ohm-meters, multi-meters, oscilloscopes, and the like. In some cases, other sensor may include a mechanical sensor. Exemplary non-limiting mechanical sensors include load cells, strain gauges, motion sensors (e.g., inertial measurement units, accelerometers, gyroscopes, etc.) vibrometers, and the like. In some cases, other sensor may include an optical sensor. As described in this disclosure, an "optical sensor" is a device that is configured to detect an optical phenomena. Exemplary non-limiting optical sensors include photodetectors, photodiodes, pyrometers, cameras, image sensors (e.g., CMOS and CCD), and the like.

With continued reference to FIG. 3, in one or more embodiments, at least a sensor may include a sensor suite which may include a plurality of sensors that may detect similar or unique phenomena. For example, in a non-limiting embodiment, sensor suite may include a plurality of voltmeters or a mixture of voltmeters and thermocouples. Aircraft 200 may include a plurality of sensors in the form of individual sensors or a sensor suite working in tandem or individually. A sensor suite may include a plurality of independent sensors, as described in this disclosure, where any number of the described sensors may be used to detect any number of physical or electrical quantities associated with an aircraft. Independent sensors may include separate sensors measuring physical or electrical quantities that may be powered by and/or in communication with circuits independently, where each may signal sensor output to a control circuit such as computing device 316. In one or more embodiments, at least a sensor may include a sense board, such as sense board. In one or more embodiments, a sense board may be connected to aircraft 200 or flight component 108. In one or more embodiments, a sense board may include one or more circuits and/or circuit elements, including, for example, a printed circuit board component. A sense board may include, without limitation, a control circuit configured to perform and/or direct any actions performed by the sense board and/or any other component and/or element described in this disclosure. The control circuit may include any analog or digital control circuit, including without limitation a combinational and/or synchronous logic circuit, a processor, microprocessor, microcontroller, or the like.

With continued reference to FIG. 3, in some embodiments, computing device 316 may be configured to receive a pilot input. For the purposes of this disclosure, a "pilot input" is the commands provided by a pilot to control the movement and behavior of an aircraft. Exemplary pilot input may include a pilot's instruction to change an aircraft's pitch, roll, yaw, throttle, and/or any combination thereof. Exemplary pilot input may include a pilot's input to computing device 316. Exemplary pilot input may include pilot's input using pilot control. Pilot input may be further described in detail above.

With continued reference to FIG. 3, in some embodiments, computing device 316 may be configured to generate a flight command as a function of sensor data, pilot input, or the like. In some embodiments, computing device 316 may be configured to generate a flight command as a function of previous iterations. As a non-limiting example, computing device 316 may generate a flight command that was previously used. For the purposes of this disclosure, a "flight command" is the collective actions and decisions to manage and direct the flight of an aircraft. In some embodiments, flight command may be configured to control the at least a flight component to perform the first flight mode and the second flight mode. As a non-limiting example, flight command may include a change of flight modes 312a-b. As another non-limiting example, flight command may include a change of fuel store (e.g. first fuel store 212a-b and second fuel store 224a-b) or fuel (e.g. first fuel 304 or second fuel 308). For example, and without limitation, flight command may include a change of fuel store from first fuel store 212a-b containing first fuel 304 to second fuel store 224a-b containing second fuel 308 or vice versa. As another non-limiting example, flight command may include one or more adjustments and/or modifications of flight component 108. As another non-limiting example, flight command may include one or more adjustments and/or modifications relating to a pitch angle of aircraft. In some embodiments, flight command may be performed automatically once computing device 316 generates flight command. In some embodiments, authorization by a human may be needed to perform flight command. In a non-limiting example, computing device 316 may generate flight command as sensor data passes a certain threshold, range or a limit of flight modes 312*a-b* for sensor data. For example, and without limitation, when first flight mode 312*a* includes a range of altitude '0 to 30,000 feet' and second flight mode 312*b* includes a range of altitude '30,001 to 45,000 feet,' computing device 316 may generate a flight command to change fuel store from first fuel store 212*a-b* to second fuel store 224*a-b* once altitude of aircraft 200 obtained from sensor of aircraft 200 changes from 10,000 feet to 40,000 feet. This is merely an example and persons skilled in the art, upon reviewing the entirety of this disclosure, may appreciate various flight command that can be used in system 300.

With continued reference to FIG. 3, in some embodiments, computing device 316 may be further configured to control which of at least a first fuel store 212*a-b* and at least a second fuel store 224*a-b* is being drawn from as a function of first flight mode 312*a* and second flight mode 312*b*. In a non-limiting example, computing device 316 may determine that fuel store (first fuel store 212*a-b* or second fuel store 224*a-b*) that includes jet fuel (first fuel 304 or second fuel 308) can be used when flight mode 312*a-b* includes cruising. In another non-limiting example, computing device 316 may determine that fuel cell 216 may be used when flight mode 312*a-b* includes 'on ground.' In another non-limiting example, computing device 316 may determine that SAF (first fuel 304 or second fuel 308) may be used for portion of a flight in which there are environmental regulations (flight mode 312*a-b*). In some embodiments, a user may manually determine which of at least a first fuel store 212*a-b* and at least a second fuel store 224*a-b* is being drawn from as a function of first flight mode 312*a* and second flight mode 312*b*. In some embodiments, computing device 316 may determine which of at least a first fuel store 212*a-b* and at least a second fuel store 224*a-b* is being drawn from as a function of first flight mode 312*a* and second flight mode 312*b* using previous iterations. In some embodiments, computing device 316 may determine which of at least a first fuel store 212*a-b* and at least a second fuel store 224*a-b* is being drawn from by controlling an actuator. In some embodiments, computing device 316 may determine which of at least a first fuel store 212*a-b* and at least a second fuel store 224*a-b* is being drawn from by controlling a valve such as to open and/or close the valve or control a fluid flow through the valve. In some embodiments, computing device 316 may determine which of at least a first fuel store 212*a-b* and at least a second fuel store 224*a-b* is being drawn from by controlling a pump in communication with first fuel store 212*a-b* and/or at least a second fuel store 224*a-b*.

Figure 4:
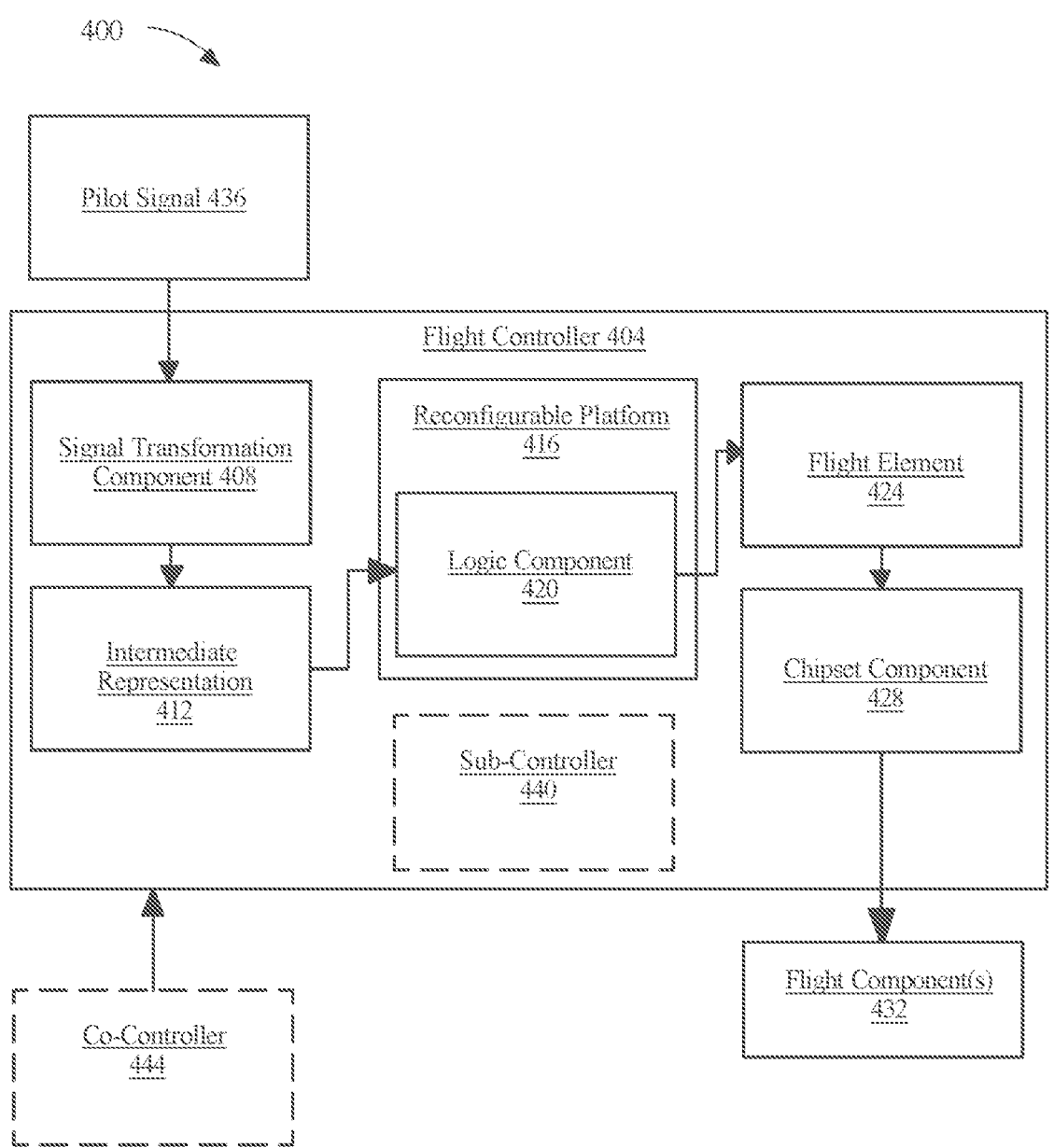
FIG. 4 illustrates an exemplary embodiment of a flight controller.

Now referring to FIG. 4, an exemplary embodiment 400 of a flight controller 404 is illustrated. In some embodiments, flight controller 404 disclosed herein may be consistent with computing device 316. Flight controller 404 may include and/or communicate with any computing device as described in this disclosure, including without limitation a microcontroller, microprocessor, digital signal processor (DSP) and/or system on a chip (SoC) as described in this disclosure. Further, flight controller 404 may include a single computing device operating independently, or may include two or more computing device operating in concert, in parallel, sequentially or the like; two or more computing devices may be included together in a single computing device or in two or more computing devices. In embodiments, flight controller 404 may be installed in an aircraft, may control the aircraft remotely, and/or may include an element installed in the aircraft and a remote element in communication therewith.

In an embodiment, and still referring to FIG. 4, flight controller 404 may include a signal transformation component 408. As used in this disclosure, a "signal transformation component" is a component that transforms and/or converts a first signal to a second signal, wherein a signal may include one or more digital and/or analog signals. For example, and without limitation, signal transformation component 408 may be configured to perform one or more operations such as preprocessing, lexical analysis, parsing, semantic analysis, and the like thereof. In an embodiment, and without limitation, signal transformation component 408 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 408 may include transforming one or more low-level languages such as, but not limited to, machine languages and/or assembly languages. For example, and without limitation, signal transformation component 408 may include transforming a binary language signal to an assembly language signal. In an embodiment, and without limitation, signal transformation component 408 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 4, signal transformation component 408 may be configured to optimize an intermediate representation 412. As used in this disclosure, an "intermediate representation" is a data structure and/or code that represents the input signal. Signal transformation component 408 may optimize intermediate representation as a function of a data-flow analysis, dependence analysis, alias analysis, pointer analysis, escape analysis, and the like thereof. In an embodiment, and without limitation, signal transformation component 408 may optimize intermediate representation 412 as a function of one or more inline expansions, dead code eliminations, constant propagation, loop transformations, and/or automatic parallelization functions. In another embodiment, signal transformation component 408 may optimize intermediate representation as a function of a machine dependent optimization such as a peephole optimization, wherein a peephole optimization may rewrite short sequences of code into more efficient sequences of code. Signal transformation component 408 may optimize intermediate representation to generate an output language, wherein an "output language," as used herein, is the native machine language of flight controller 404. For example, and without limitation, native machine language may include one or more binary and/or numerical languages.

In an embodiment, and without limitation, signal transformation component 408 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 4, flight controller 404 may include a reconfigurable hardware platform 416. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic.

Still referring to FIG. 4, reconfigurable hardware platform 416 may include a logic component 420. As used in this disclosure, a "logic component" is a component that executes instructions on output language. For example, and without limitation, logic component may perform basic arithmetic, logic, controlling, input/output operations, and the like thereof. Logic component 420 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 420 may be organized according to Von Neumann and/or Harvard architecture as a non-limiting example. Logic component 420 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 420 may include one or more integrated circuit microprocessors, which may contain one or more central processing units, central processors, and/or main processors, on a single metal-oxide-semiconductor chip. Logic component 420 may be configured to execute a sequence of stored instructions to be performed on the output language and/or intermediate representation 412. Logic component 420 may be configured to fetch and/or retrieve the instruction from a memory cache, wherein a "memory cache," as used in this disclosure, is a stored instruction set on flight controller 404. Logic component 420 may be configured to decode the instruction retrieved from the memory cache to opcodes and/or operands. Logic component 420 may be configured to execute the instruction on intermediate representation 412 and/or output language. For example, and without limitation, logic component 420 may be configured to execute an addition operation on intermediate representation 412 and/or output language.

In an embodiment, and without limitation, logic component 420 may be configured to calculate a flight element 424. As used in this disclosure, a "flight element" is an element of datum denoting a relative status of aircraft. For example, and without limitation, flight element 424 may denote one or more torques, thrusts, airspeed velocities, forces, altitudes, groundspeed velocities, directions during flight, directions facing, forces, orientations, and the like thereof. For example, and without limitation, flight element 424 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 424 may denote that aircraft is following a flight path accurately and/or sufficiently.

Still referring to FIG. 4, flight controller 404 may include a chipset component 428. As used in this disclosure, a "chipset component" is a component that manages data flow. In an embodiment, and without limitation, chipset component 428 may include a northbridge data flow path, wherein the northbridge dataflow path may manage data flow from logic component 420 to a high-speed device and/or component, such as a RAM, graphics controller, and the like thereof. In another embodiment, and without limitation, chipset component 428 may include a southbridge data flow path, wherein the southbridge dataflow path may manage data flow from logic component 420 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 428 may manage data flow between logic component 420, memory cache, and a flight component 432. Flight component 432 disclosed herein may be consistent with flight component disclosed with respect to FIGS. 1-3. For example, flight component 432 may include a component used to affect the aircrafts' roll and pitch which may comprise one or more ailerons. As a further example, flight component 432 may include a rudder to control yaw of an aircraft. In an embodiment, chipset component 428 may be configured to communicate with a plurality of flight components as a function of flight element 424. For example, and without limitation, chipset component 428 may transmit to an aircraft rotor to reduce torque of a first lift propulsor and increase the forward thrust produced by a pusher component to perform a flight maneuver.

In an embodiment, and still referring to FIG. 4, a flight controller 404 may control aircraft or flight components 432 as a function of pilot signal. As used in this disclosure a "pilot signal" is an element of datum representing one or more functions a pilot is controlling and/or adjusting. Pilot signal 436 disclosed herein may be consistent with pilot input in this disclosure. For example, pilot signal 436 may denote that a pilot is controlling and/or maneuvering ailerons, wherein the pilot is not in control of the rudders and/or propulsors. In an embodiment, pilot signal 436 may include an implicit signal and/or an explicit signal. For example, and without limitation, pilot signal 436 may include an explicit signal, wherein the pilot explicitly states there is a lack of control and/or desire for autonomous function. As a further non-limiting example, pilot signal 436 may include an explicit signal directing flight controller 404 to control and/or maintain a portion of aircraft, a portion of the flight plan, the entire aircraft, and/or the entire flight plan. As a further non-limiting example, pilot signal 436 may include an implicit signal, wherein flight controller 404 detects a lack of control such as by a malfunction, torque alteration, flight path deviation, and the like thereof. In an embodiment, and without limitation, pilot signal 436 may include one or more explicit signals to reduce torque, and/or one or more implicit signals that torque may be reduced due to reduction of airspeed velocity. In an embodiment, and without limitation, pilot signal 436 may include one or more local and/or global signals. For example, and without limitation, pilot signal 436 may include a local signal that is transmitted by a pilot and/or crew member. As a further non-limiting example, pilot signal 436 may include a global signal that is transmitted by air traffic control and/or one or more remote users that are in communication with the pilot of aircraft. In an embodiment, pilot signal 436 may be received as a function of a tri-state bus and/or multiplexor that denotes an explicit pilot signal should be transmitted prior to any implicit or global pilot signal.

Still referring to FIG. 4, flight controller 404 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 4, flight controller 404 may include, but is not limited to, for example, a cluster of flight controllers in a first location and a second flight controller or cluster of flight controllers in a second location. Flight controller 404 may include one or more flight controllers dedicated to data storage, security, distribution of traffic for load balancing, and the like. Flight controller 404 may be configured to distribute one or more computing tasks as described below across a plurality of flight controllers, which may operate in parallel, in series, redundantly, or in any other manner used for distribution of tasks or memory between computing devices. For example, and without limitation, flight controller 404 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by Math Works, Natick, Massachusetts, USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 4, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 432. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 4, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 404. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 412 and/or output language from logic component 420, wherein output language may include one or more analog-to-digital conversions, low bit rate transmissions, message encryptions, digital signals, binary signals, logic signals, analog signals, and the like thereof described above in detail.

Still referring to FIG. 4, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 4, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 4, flight controller 404 may also be implemented using a "shared nothing" architecture in which data is cached at the worker, in an embodiment, this may enable scalability of aircraft and/or computing device. Flight controller 404 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers.

Still referring to FIG. 4, flight controller may include a sub-controller 440. As used in this disclosure a "sub-controller" is a controller and/or component that is part of a distributed controller as described above; for instance, flight controller 404 may be and/or include a distributed flight controller made up of one or more sub-controllers. For example, and without limitation, sub-controller 440 may include any controllers and/or components thereof that are similar to distributed flight controller and/or flight controller as described above. Sub-controller 440 may include any component of any flight controller as described above. Sub-controller 440 may be implemented in any manner suitable for implementation of a flight controller as described above. As a further non-limiting example, sub-controller 440 may include one or more processors, logic components and/or computing devices capable of receiving, processing, and/or transmitting data across the distributed flight controller as described above. As a further non-limiting example, sub-controller 440 may include a controller that receives a signal from a first flight controller and/or first distributed flight controller component and transmits the signal to a plurality of additional sub-controllers and/or flight components.

Still referring to FIG. 4, flight controller may include a co-controller 444. As used in this disclosure a "co-controller" is a controller and/or component that joins flight controller 404 as components and/or nodes of a distributer flight controller as described above. For example, and without limitation, co-controller 444 may include one or more controllers and/or components that are similar to flight controller 404. As a further non-limiting example, co-controller 444 may include any controller and/or component that joins flight controller 404 to distributer flight controller. As a further non-limiting example, co-controller 444 may include one or more processors, logic components and/or computing devices capable of receiving, processing, and/or transmitting data to and/or from flight controller 404 to distributed flight control system. Co-controller 444 may include any component of any flight controller as described above. Co-controller 444 may be implemented in any manner suitable for implementation of a flight controller as described above.

In an embodiment, and with continued reference to FIG. 4, flight controller 404 may be designed and/or configured to perform any method, method step, or sequence of method steps in any embodiment described in this disclosure, in any order and with any degree of repetition. For instance, flight controller 404 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 5:
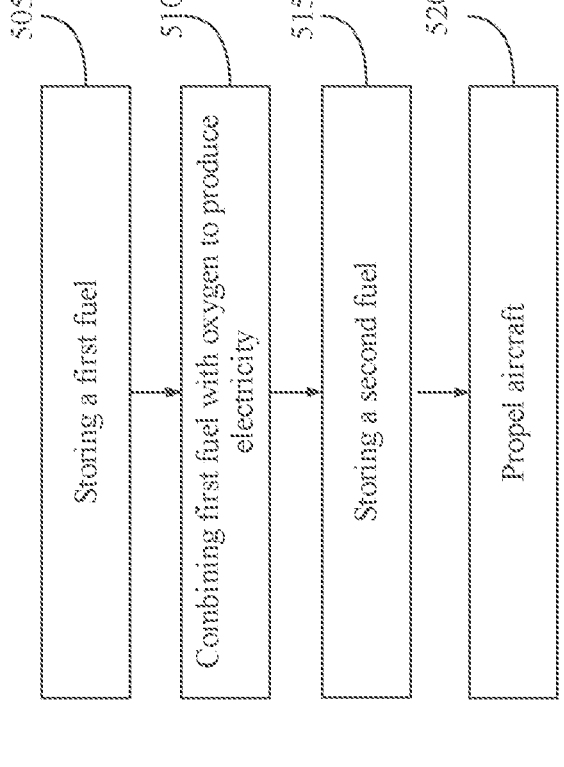
FIG. 5 illustrates a flow diagram of an exemplary method of use of an exemplary blended wing body aircraft.

Referring now to FIG. 5, a method 500 of use for a blended wing body aircraft with a fuel cell is illustrated by way of a flow diagram. At step 505, method 500 may include storing a first fuel, using at least a first fuel store. First fuel may include any fuel described in this disclosure, for example with reference to FIGS. 1-4. First fuel store may include any fuel store described in this disclosure, for example with reference to FIGS. 1-4. In some embodiments, first fuel may include one or more of liquid hydrogen and natural gas. In some embodiments, first fuel store may be at least partially located within a transitional portion of blended wing body. In some embodiments, first fuel store may include at least a fuel environment control mitigation.

With continued reference to FIG. 5, at step 510, method 500 may include combining first fuel with an oxidizing agent to produce electricity, using at least a fuel cell. Fuel cell may include any fuel cell described in this disclosure, for example with reference to FIGS. 1-4. Oxidizing agent may include any oxidizing agent, such as without limitation oxygen, described in this disclosure, for example with reference to FIGS. 1-4.

With continued reference to FIG. 5, at step 515, method 500 may include storing a second fuel store, using at least a second fuel store located within a wing portion of the blended wing body. At least a second fuel store may include any fuel store described in this disclosure, including with reference to FIGS. 1-4. In some embodiments, second fuel may include one or more of a gasoline based fuel and a kerosene based fuel.

With continued reference to FIG. 5, at step 520, method 500 may include propelling aircraft, using at least a propulsor mechanically affixed to the aircraft, wherein the aircraft has a blended wing body. Propulsor may include any propulsor described in this disclosure, for example with reference to FIGS. 1-4. Blended wing body may include any blended wing body described in this disclosure, for example with reference to FIGS. 1-4.

Still referring to FIG. 5, in some embodiments, method 500 may additionally include burning, using at least a combustion engine of at least a propulsor, second fuel, and producing, using the at least a combustion engine, mechanical work which is used to power the at least a propulsor. Combustion engine may include any combustion engine described in this disclosure, for example with reference to FIGS. 1-4.

Still referring to FIG. 5, in some embodiments, method 500 may additionally include powering, using at least a fuel cell, at least an electric motor of at least a propulsor, operatively connected with the at least a fuel cell. Electric motor may include any electric motor described in this disclosure, for example with reference to FIGS. 1-4.

Still referring to FIG. 5, in some embodiments, method 500 may additionally include burning, using at least a combustion engine of at least a propulsor, second fuel; producing, using the at least a combustion engine, mechanical work which is used to power the at least a propulsor; and powering, using at least a fuel cell, at least an electric motor of the at least a propulsor, operatively connected with the at least a fuel cell.

Still referring to FIG. 5, in some embodiments, method 500 may additionally include powering, using at least a fuel cell, an auxiliary power system operatively connected with the at least a fuel cell. Auxiliary power system may include any auxiliary power system described in this disclosure, for example with reference to FIGS. 1-4. In some cases, method 500 may further include powering, using auxiliary power system, one or more of an avionic system, a flight control system, an environmental control system, and anti-ice system, a lighting system, a fuel system, a braking system, and a landing gear system.

Still referring to FIG. 5, in some embodiments, method 500 may additionally include storing, using a second fuel store, a second fuel, burning, using at least a combustion engine of at least a propulsor, the second fuel, and producing, using the at least a combustion engine, mechanical work which is used to power the at least a propulsor. Second fuel may include any fuel described in this disclosure, for example with reference to FIGS. 1-4.

Figure 6:
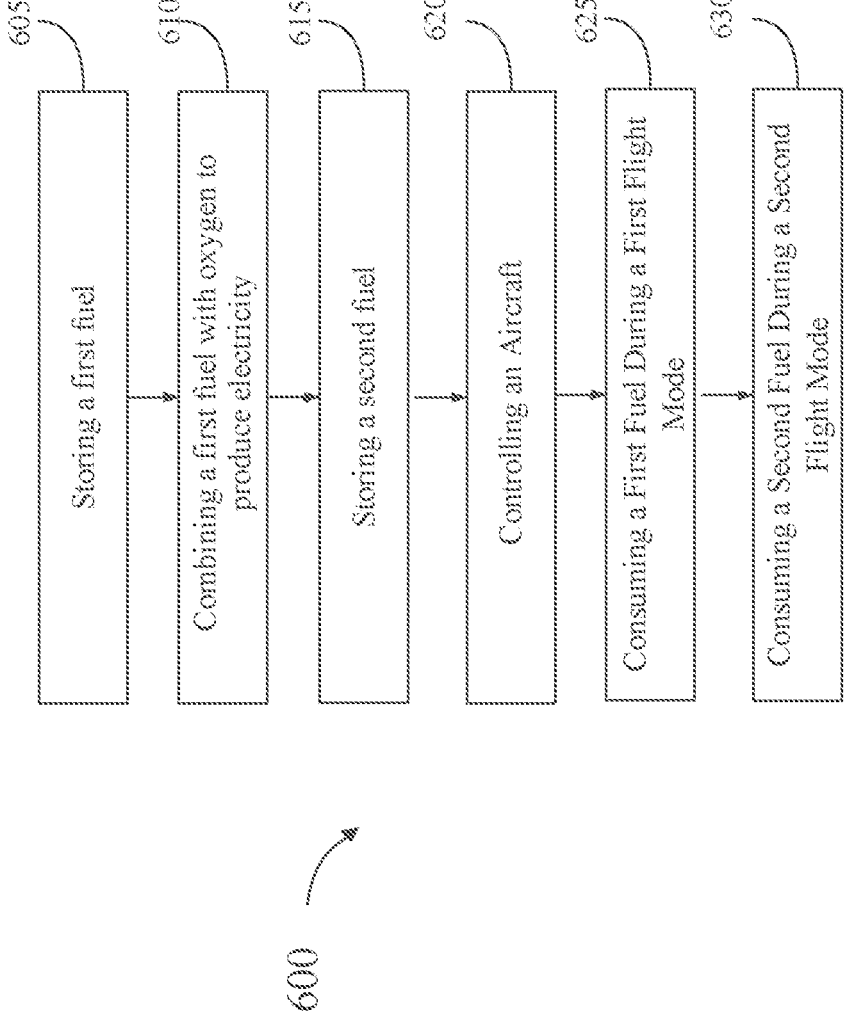
FIG. 6 illustrates a flow diagram of an exemplary method of use of an aircraft with a fuel cell.

Referring now to FIG. 6, a flow diagram of an exemplary method 600 of use of an aircraft with a fuel cell is illustrated. Method 600 includes a step 605 of storing, using at least a first fuel store located within the aircraft, a first fuel. This may be implemented with respect to FIGS. 1-5.

With continued reference to FIG. 6, method 600 includes a step 610 of combining, using at least a fuel cell, a first fuel with oxygen to produce electricity. In some embodiments, method 600 may further include powering, using the at least a fuel cell, at least an electric motor of the at least a propulsor, wherein the at least an electric motor is operatively connected with the at least a fuel cell. In some embodiments, method 600 may further include powering, using the at least a fuel cell, an auxiliary power system of the at least a flight component, wherein the auxiliary power system is operatively connected with the at least a fuel cell. These may be implemented with respect to FIGS. 1-5.

With continued reference to FIG. 6, method 600 includes a step 615 of storing, using at least a second fuel store located within an aircraft, a second fuel. In some embodiments, method 600 may further include locating the at least a first fuel store within a transitional portion area of a blended wing body of the aircraft and the at least a second fuel store within a wing portion of the blended wing body of the aircraft. These may be implemented with respect to FIGS. 1-5.

With continued reference to FIG. 6, method 600 includes a step 620 of propelling, using at least a flight component mechanically affixed to an aircraft, the aircraft. In some embodiments, method 600 may further include generating, using a computing device of the aircraft, a flight command as a function of sensor data, wherein the flight command is configured to control the at least a flight component to perform the first flight mode and the second flight mode. In some embodiments, method 600 may further include controlling, using the computing device of the aircraft, which of the at least a first fuel store and the at least a second fuel store is being drawn from as a function of the first flight mode and the second flight mode. In some embodiments, method 600 may further include generating, using the computing device of the aircraft, the flight command as a function of a pilot input. In some embodiments, the at least a flight component may include at least a propulsor, wherein the at least a propulsor comprises at least a combustion engine that burns the second fuel and produces mechanical work which is used to power the at least a propulsor. These may be implemented with respect to FIGS. 1-5.

With continued reference to FIG. 6, method 600 includes a step 625 of consuming the first fuel of the at least a first fuel store during the first flight mode of the aircraft. This may be implemented with respect to FIGS. 1-5.

With continued reference to FIG. 6, method 600 includes a step 630 of consuming the second fuel of the at least a first second store during the second flight mode of the aircraft. In some embodiments, the first flight mode may include a first portion of a flight time of the aircraft and the second flight mode may include a second portion of a flight time of the aircraft. In some embodiments, the first flight mode may include a takeoff and landing of the aircraft and the second flight mode may include a cruising of the aircraft. These may be implemented with respect to FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
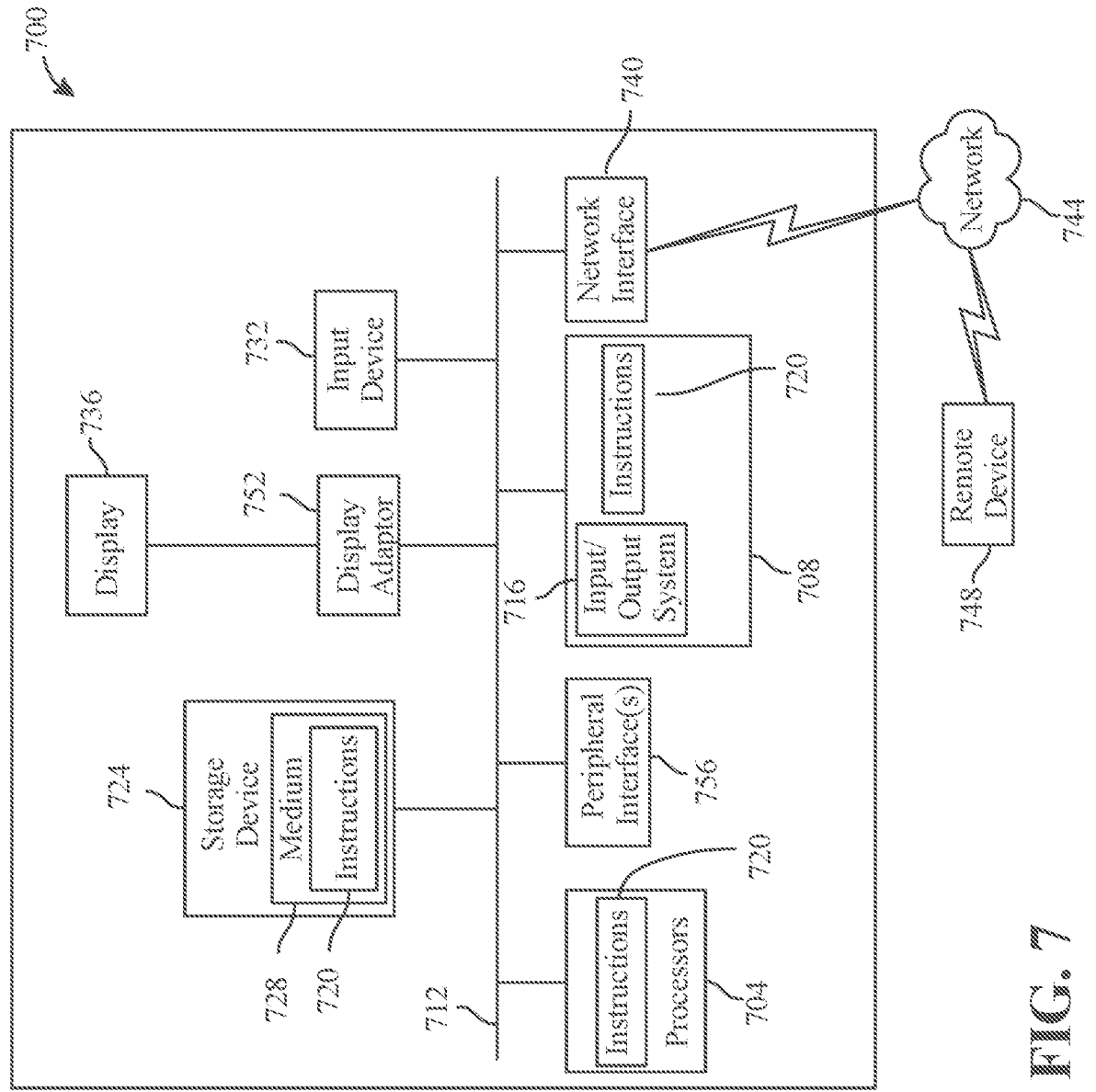
FIG. 7 illustrates a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIRE-WIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An aircraft with a fuel cell, the aircraft comprising:
   at least a first fuel store located within the aircraft and configured to store a first fuel, wherein the first fuel of the at least a first fuel store is consumed during a first flight mode of the aircraft;
   at least a fuel cell operatively connected to an auxiliary power unit and configured to combine the first fuel with oxygen to produce electricity for the auxiliary power unit during the first flight mode of the aircraft;
   at least a second fuel store located within the aircraft and configured to store a second fuel, wherein the second fuel of the at least a second fuel store is consumed solely during a second flight mode of the aircraft, wherein the first fuel is consumed first and the second fuel is consumed second; and
   at least a flight component mechanically affixed to the aircraft and configured to propel the aircraft.

2. The aircraft of claim 1, further comprising:
   a blended wing body, wherein the at least a first fuel store is located within a transitional portion area of the blended wing body and the at least a second fuel store is located within a wing portion of the blended wing body.

3. The aircraft of claim 1, further comprising:
   a computing device, wherein the computing device is configured to generate a flight command as a function of sensor data, wherein the flight command is configured to control the at least a flight component to perform the first flight mode and the second flight mode.

4. The aircraft of claim 3, wherein the computing device is further configured to control which of the at least a first fuel store and the at least a second fuel store is drawn from as a function of the first flight mode and the second flight mode.

5. The aircraft of claim 3, wherein the computing device is further configured to generate the flight command as a function of a pilot input.

6. The aircraft of claim 1, wherein the at least a flight component comprises at least a propulsor, wherein the at least a propulsor comprises at least a combustion engine that burns the second fuel and produces mechanical work which is used to power the at least a propulsor.

7. The aircraft of claim 6, wherein the at least a propulsor comprises at least an electric motor operatively connected with the at least a fuel cell, wherein the at least a fuel cell is configured to power the at least an electric motor.

8. The aircraft of claim 1, wherein the at least a flight component comprises an auxiliary power system operatively connected with the at least a fuel cell, wherein the at least a fuel cell is configured to power the auxiliary power system.

9. The aircraft of claim 1, wherein:

the first flight mode comprises a first portion of a flight time of the aircraft; and the second flight mode comprises a second portion of a flight time of the aircraft.

10. The aircraft of claim 1, wherein:

the first flight mode comprises a takeoff and landing of the aircraft; and the second flight mode comprises a cruising of the aircraft.

11. A method of use of an aircraft with a fuel cell, the method comprising:

storing, using at least a first fuel store located within the aircraft, a first fuel;

combining, using at least a fuel cell operatively connected to an auxiliary power unit, the first fuel with oxygen to produce electricity for the auxiliary power unit during a first flight mode of the aircraft;

storing, using at least a second fuel store located within the aircraft, a second fuel, wherein the first fuel is consumed first and the second fuel is consumed second;

propelling, using at least a flight component mechanically affixed to the aircraft, the aircraft;

consuming the first fuel of the at least a first fuel store during a first flight mode of the aircraft; and consuming the second fuel of the at least a second fuel store solely during a second flight mode of the aircraft.

12. The method of claim 11, further comprising:

locating the at least a first fuel store within a transitional portion area of a blended wing body of the aircraft and the at least a second fuel store within a wing portion of the blended wing body of the aircraft.

13. The method of claim 11, further comprising:

generating, using a computing device of the aircraft, a flight command as a function of sensor data, wherein the flight command is configured to control the at least a flight component to perform the first flight mode and the second flight mode.

14. The method of claim 13, further comprising:

controlling, using the computing device of the aircraft, which of the at least a first fuel store and the at least a second fuel store is drawn from as a function of the first flight mode and the second flight mode.

15. The method of claim 13, further comprising:

generating, using the computing device of the aircraft, the flight command as a function of a pilot input.

16. The method of claim 11, wherein the at least a flight component comprises at least a propulsor, wherein the at least a propulsor comprises at least a combustion engine that burns the second fuel and produces mechanical work which is used to power the at least a propulsor.

17. The method of claim 16, further comprising:

powering, using the at least a fuel cell, at least an electric motor of the at least a propulsor, wherein the at least an electric motor is operatively connected with the at least a fuel cell.

18. The method of claim 11, further comprising:

powering, using the at least a fuel cell, an auxiliary power system of the at least a flight component, wherein the auxiliary power system is operatively connected with the at least a fuel cell.

19. The method of claim 11, wherein:

the first flight mode comprises a first portion of a flight time of the aircraft; and the second flight mode comprises a second portion of a flight time of the aircraft.

20. The method of claim 11, wherein:

the first flight mode comprises a takeoff and landing of the aircraft; and the second flight mode comprises a cruising of the aircraft.

\* \* \* \* \*